United States Patent
Millar et al.

(10) Patent No.: US 9,338,405 B2
(45) Date of Patent: May 10, 2016

(54) SCRAMBLED DIGITAL DATA ITEM

(75) Inventors: Keith Millar, Haywards Heath (GB); Colin Harvey, Southampton (GB)

(73) Assignee: Cisco Technology, Inc., San Jose, CA (US)

( * ) Notice: Subject to any disclaimer, the term of this patent is extended or adjusted under 35 U.S.C. 154(b) by 2343 days.

(21) Appl. No.: 12/224,749

(22) PCT Filed: May 3, 2007

(86) PCT No.: PCT/GB2007/001623
§ 371 (c)(1),
(2), (4) Date: Oct. 10, 2008

(87) PCT Pub. No.: WO2007/132165
PCT Pub. Date: Nov. 22, 2007

(65) Prior Publication Data
US 2009/0028331 A1     Jan. 29, 2009

Related U.S. Application Data

(60) Provisional application No. 60/797,704, filed on May 4, 2006.

(51) Int. Cl.
*H04N 7/16* (2011.01)
*H04N 7/167* (2011.01)
(Continued)

(52) U.S. Cl.
CPC ......... *H04N 7/1675* (2013.01); *H04N 7/17318* (2013.01); *H04N 21/2662* (2013.01);
(Continued)

(58) Field of Classification Search
USPC .................................. 380/210, 231, 233, 239
See application file for complete search history.

(56) References Cited

U.S. PATENT DOCUMENTS 5,870,474 A    2/1999   Wasilewski et al.
6,061,451 A    5/2000   Muratani et al.
(Continued)

FOREIGN PATENT DOCUMENTS

EP     1 182 874 A1    2/2002
JP     10327389        12/1998
(Continued)

OTHER PUBLICATIONS

Sep. 30, 2011 Office Communication in connection with prosecution of EP 07 732 656.9.
(Continued)

*Primary Examiner* — Benjamin Lanier
(74) *Attorney, Agent, or Firm* — Hahn Loeser & Parks, LLP

(57) ABSTRACT

A method of decrypting a scrambled digital data item at a client is disclosed, the method including: receiving actual control messages at the client, wherein each actual control message includes control word generating information for generating a control word associated with the actual control message; storing the actual control messages at the client; receiving the scrambled digital data item at the client independently of the actual control messages, wherein the scrambled digital data item includes a plurality of segments of scrambled digital data, each segment of scrambled digital data being associated with one of the actual control messages and being scrambled with the control word associated with the one of the actual control messages, and wherein the scrambled digital data item further includes a plurality of reference control messages, each segment of scrambled digital data comprising one of the reference control messages, each of the reference control messages including a control message reference value identifying the actual control message associated with the segment of scrambled digital data; and decrypting the scrambled digital data item using the plurality of actual control messages.

7 Claims, 18 Drawing Sheets

(51) Int. Cl.

| | | |
|---|---|---|
| *H04N 7/173* | (2011.01) | |
| *H04N 21/2662* | (2011.01) | |
| *H04N 21/438* | (2011.01) | |
| *H04N 21/4405* | (2011.01) | |
| *H04N 21/4623* | (2011.01) | |
| *H04N 21/61* | (2011.01) | |
| *H04N 21/643* | (2011.01) | |

(52) U.S. Cl.
CPC ....... *H04N21/4384* (2013.01); *H04N 21/4405* (2013.01); *H04N 21/4623* (2013.01); *H04N 21/6125* (2013.01); *H04N 21/64322* (2013.01)

(56) References Cited

U.S. PATENT DOCUMENTS

| | | | | |
|---|---|---|---|---|
| 6,178,242 | B1* | 1/2001 | Tsuria | 380/201 |
| 6,256,393 | B1 | 7/2001 | Safadi et al. | |
| 6,587,561 | B1 | 7/2003 | Sered et al. | |
| 7,000,241 | B2 | 2/2006 | Klauss et al. | |
| 7,191,335 | B1* | 3/2007 | Maillard | 713/176 |
| 7,379,548 | B2* | 5/2008 | Revital et al. | 380/240 |
| 7,647,641 | B2* | 1/2010 | Dubroeucq et al. | 726/27 |
| 7,860,013 | B2* | 12/2010 | Michel | 370/241 |
| 2002/0170053 | A1* | 11/2002 | Peterka et al. | 725/31 |
| 2002/0174430 | A1* | 11/2002 | Ellis et al. | 725/46 |
| 2003/0200548 | A1* | 10/2003 | Baran et al. | 725/90 |
| 2003/0208767 | A1 | 11/2003 | Williamson et al. | |
| 2004/0045036 | A1 | 3/2004 | Terasaki | |
| 2004/0083177 | A1* | 4/2004 | Chen et al. | 705/50 |
| 2005/0125653 | A1 | 6/2005 | Becker et al. | |
| 2005/0152553 | A1* | 7/2005 | Kosugi et al. | 380/286 |
| 2006/0155989 | A1* | 7/2006 | Nishimoto et al. | 713/166 |
| 2007/0101012 | A1* | 5/2007 | Li et al. | 709/231 |
| 2007/0124602 | A1* | 5/2007 | Wald et al. | 713/193 |
| 2008/0170687 | A1* | 7/2008 | Moors et al. | 380/200 |

FOREIGN PATENT DOCUMENTS

| | | |
|---|---|---|
| JP | 2001119357 | 4/2001 |
| WO | WO 01/20836 A2 | 3/2001 |
| WO | WO 02/104026 A1 | 12/2002 |
| WO | WO 03/107665 A1 | 12/2003 |
| WO | WO 03/107670 A1 | 12/2003 |
| WO | WO 2004/071091 A1 | 8/2004 |

OTHER PUBLICATIONS

Nov. 12, 2009 Office Communication in connection with EP 07 732 656.9.

Aug. 10, 2012 Office Communication in connection with prosecution of EP 11 19 0147.6.

\* cited by examiner

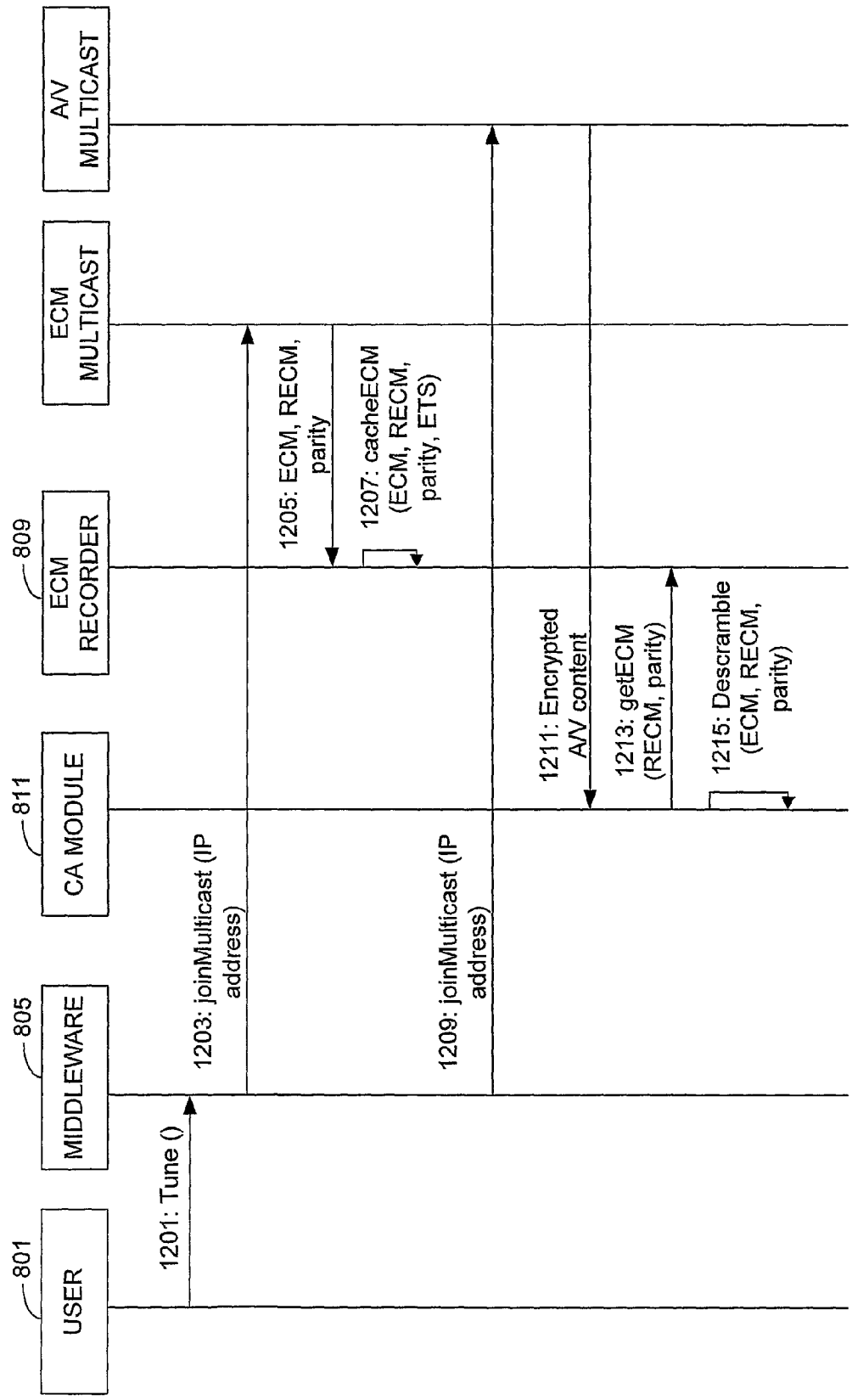

SCRAMBLED DIGITAL DATA ITEM

The present application is a 35 USC 0371 application of PCT/GB2007/001623, filed on 3 May 2007 and entitled "Scrambled Digital Data Item", which was published on 22 Nov. 2007 in the English language with International Publication Number WO2007/132165 A1, and which relies for priority on U.S. Provisional Pat App. Ser. No. 60/797,704, filed on 4 May 2006.

FIELD OF THE INVENTION

The present invention relates to methods for storing a scrambled digital data item in a network, providing a scrambled digital data item to a client and decrypting a scrambled digital data item at a client.

BACKGROUND OF THE INVENTION

IPTV (Internet Protocol Television) is a system where a digital television service is delivered using the Internet Protocol over a network infrastructure, which may include delivery by a broadband connection. Video content is typically compressed (i.e. the quantity of data used to represent the video content is reduced without an excessive reduction in quality) and then sent in a transport stream delivered via IP Multicast in case of live TV video content or via IP Unicast in case of Video on Demand (VOD) content.

Users of an IPTV service may have a personal video recorder (PVR)—a device that records video without videotape to a hard disk drive-based digital storage medium. Many PVRs are configured to receive two audio/video streams allowing users to view one of the A/V streams whilst recording the other A/V stream. In addition to recording without videotape, PVRs provide an end user with the functionality to fast forward, rewind and pause the video; the ability to instantly jump to any part of the video without having to rewind or fast forward the data stream; and often the ability to pause live video and start viewing video before the recording has finished. Commonly the hard drive forms part of a set top box (STB) that is connected to a display device such as a television. However, there is a very large number of STBs that have been deployed without hard drives leaving the users of such STBs without the PVR functionality described above.

A network personal video recorder (nPVR) has similar functionality to that of a PVR except that it stores video content on a network server instead of a local hard disk thus giving users of STBs deployed without hard drives the PVR functionality described above.

It is common for IPTV video content to be encrypted (obscured to make it unreadable without some special knowledge; sometimes referred to as scrambled). The control words used to encrypt the video are typically inserted into entitlement control message (ECM) packets and these ECMs are delivered to a STB as part of the video transport stream or on a separate port within the same multicast on which the transport stream is delivered.

U.S. Pat. No. 6,587,561 B1 describes a key delivery method for use in an encoded communications system in which at least one encoded item including a first item encoded with a first item control word is sent in a communication stream from a sender to a receiver, the method including transmitting an item entitlement control message (IECM) including item control information, transmitting a stream entitlement control message (SECM) including stream control information, and combining at least part of the item control information and at least part of the stream control information to produce the first item control word.

The disclosures of all references mentioned above and throughout the present specification, as well as the disclosures of all references mentioned in those references, are hereby incorporated herein by reference.

SUMMARY OF THE INVENTION

As mentioned above, ECMs are typically delivered to a STB together with the video content to which they relate. In an nPVR environment, this would involve storing the ECMs with the video content in the network. However, there are problems associated with video content recording equipment (such as a VOD server) storing ECMs because such recording equipment tries to minimise the amount of data manipulation it performs otherwise the performance of the equipment can be adversely affected. Also, ECMs are preferably delivered to the STB at least 400 ms before the CW (which is generated from the ECM) that is used to descramble the video content and this is difficult to achieve if the ECMs are stored with the video content in the network.

Moreover, in an IPTV system, the amount of final mile bandwidth (that is, the bandwidth from TV operator to the subscriber) is very limited and normally does not allow for the simultaneous delivery of two A/V streams to a subscriber.

There is provided in accordance with an embodiment of the present invention, a method of decrypting a scrambled digital data item at a client, the method including: receiving actual control messages at the client, wherein each actual control message includes control word generating information for generating a control word associated with the actual control message; storing the actual control messages at the client; receiving the scrambled digital data item at the client independently of the actual control messages, wherein the scrambled digital data item includes a plurality of segments of scrambled digital data, each segment of scrambled digital data being associated with one of the actual control messages and being scrambled with the control word associated with the one of the actual control messages, and wherein the scrambled digital data item further includes a plurality of reference control messages, each segment of scrambled digital data including one of the reference control messages, each of the reference control messages including a control message reference value identifying the actual control message associated with the segment of scrambled digital data; and decrypting the scrambled digital data item using the plurality of actual control messages.

Preferably, the actual control messages are received via a multicast.

Alternatively, the actual control messages are preferably received via a broadcast television network.

Preferably, the scrambled digital data item is received via a multicast.

Alternatively, the scrambled digital data item is preferably received via a broadcast television network.

Preferably, receiving the scrambled digital data item includes receiving a portion of the scrambled digital data item.

Preferably, the method further includes: stopping the receiving of the portion of the scrambled digital data item whilst continuing to receive actual control messages associated with a subsequent portion of the scrambled digital data item; receiving, via a unicast, the subsequent portion of the scrambled digital data item; and decrypting the subsequent portion of the scrambled digital data item using the actual control messages.

Alternatively, the method preferably further includes: stopping the receiving of said portion of the scrambled digital data item whilst continuing to receive actual control messages associated with a subsequent portion of the scrambled digital data item; receiving, via a unicast, actual control messages associated with a previous portion of the scrambled digital data item; receiving, via a unicast, the previous portion of the scrambled digital data item; and decrypting the previous portion of the scrambled digital data item using the actual control messages received via the unicast.

Preferably, a command from the client causes the stopping of receiving of the portion of the scrambled digital data item.

Preferably, a command from the client causes the receiving, via a unicast, of the subsequent portion of the scrambled digital data item.

Preferably, a command from the client causes the receiving, via a unicast, of the previous portion of the scrambled digital data item.

Preferably, the scrambled digital data item is received via a unicast.

Preferably, all actual control messages associated with the scrambled digital data item are received in a single control message file.

Preferably, the actual control messages are received via a multicast in advance of the scrambled digital data item, and the scrambled digital data item is received via a unicast.

In accordance with another embodiment of the present invention, there is provided a method of decrypting a scrambled digital data item at a client, the method including: receiving a first portion of the scrambled digital data item at the client via a broadcast as a broadcast scrambled digital data item, the broadcast scrambled digital data item including a plurality of broadcast control messages, each broadcast control message comprising broadcast control word generating information for generating a broadcast control word associated with the broadcast control message, the broadcast scrambled digital data item also comprising a plurality of segments of broadcast scrambled digital data, each segment of the broadcast scrambled digital data being associated with one of the plurality of broadcast control messages and being scrambled using the broadcast control word associated with the one of the broadcast control messages; decrypting the first portion of the scrambled digital data item using the plurality of broadcast control messages; stopping the receiving of the broadcast scrambled digital data item; receiving actual control messages at the client, wherein each actual control message comprises control word generating information for generating a control word associated with the actual control message; storing the actual control messages at the client; receiving a further portion of the scrambled digital data item at the client, wherein the further portion of the scrambled digital data item includes a plurality of segments of scrambled digital data, each segment of scrambled digital data being associated with one of the actual control messages and being scrambled with the control word associated with the one of the actual control messages, and wherein the further portion of the scrambled digital data item further includes a plurality of reference control messages, each segment of scrambled digital data comprising one of the reference control messages, each of the reference control messages including a control message reference value identifying the actual control message associated with the segment of scrambled digital data; and decrypting the further portion of the scrambled digital data item using the plurality of actual control messages.

Preferably, a command from the client causes the stopping of receiving of the broadcast scrambled digital data item.

In accordance with yet another embodiment of the present invention there is provided a method of providing a scrambled digital data item to a client, the method including: providing actual control messages to the client, wherein each actual control message is identified by a control message reference value, wherein each actual control message includes control word generating information for generating a control word associated with the actual control message; and providing the scrambled digital data item to the client, the scrambled digital data item including a plurality of segments of scrambled digital data, each segment of scrambled digital data being associated with one of the actual control messages and being scrambled with the control word associated with the one of the actual control messages; wherein the scrambled digital data item is provided independently of the actual control messages, and wherein the scrambled digital data item further includes a plurality of reference control messages, each segment of scrambled digital data including one of the reference control messages, each of the reference control messages including a control message reference value identifying the actual control message associated with the segment of scrambled digital data.

Preferably, the actual control messages are provided via a multicast.

Alternatively, the actual control messages are provided via a broadcast television network.

Preferably, the scrambled digital data item is provided via a multicast.

Alternatively, the scrambled digital data item is provided via a broadcast television network.

Preferably, providing the scrambled digital data item to the client includes providing a portion of the scrambled digital data item to the client.

Preferably, the method further includes: stopping the providing of the portion of the scrambled digital data item whilst continuing to provide actual control messages associated with a subsequent portion of the scrambled digital data item; providing, via a unicast, the subsequent portion of the scrambled digital data item.

Alternatively, the method further includes: stopping the providing of the portion of the scrambled digital data item whilst continuing to provide actual control messages associated with a subsequent portion of the scrambled digital data item; providing, via a unicast, actual control messages associated with a previous portion of the scrambled digital data item; and providing, via a unicast, the previous portion of the scrambled digital data item.

Preferably, a command received from the client causes the stopping of providing of the portion of the scrambled digital data item.

Preferably, a command received from the client causes the providing, via a unicast, of the subsequent portion of the scrambled digital data item.

Preferably, a command received from the client causes the providing, via a unicast, of the previous portion of the scrambled digital data item.

Preferably, the scrambled digital data item is provided via a unicast.

Preferably, all actual control messages associated with the scrambled digital data item are provided in a single control message file.

Preferably, actual control messages are provided via a multicast in advance of the scrambled digital data item, and the scrambled digital data item is provided via a unicast.

Preferably, providing the scrambled digital data item to the client includes providing a portion of the scrambled digital data item to the client via a multicast, the method further including: providing the actual control messages to an actual control message store in a network; providing the scrambled digital data item to a scrambled digital data store in the network; stopping the providing of the portion of the scrambled digital data item whilst continuing to provide actual control messages associated with a subsequent portion of the scrambled digital data item; providing from the actual control message store via a unicast, actual control messages associated with the subsequent portion of the scrambled digital data item; and providing from the scrambled digital data store via a unicast, the subsequent portion of the scrambled digital data item.

Alternatively, providing the scrambled digital data item to the client includes providing a portion of the scrambled digital data item to the client via a multicast, the method further including: providing the actual control messages to an actual control message store in a network; providing the scrambled digital data item to a scrambled digital data store in the network; stopping the providing of the portion of the scrambled digital data item whilst continuing to provide actual control messages associated with a subsequent portion of the scrambled digital data item; providing from the actual control message store via a unicast, actual control messages associated with a previous portion of the scrambled digital data item; and providing from the scrambled digital data store via a unicast, the previous portion of the scrambled digital data item.

According to a further embodiment of the present invention, there is provided a method of providing a scrambled digital data item to a client, the method including: providing a first portion of the scrambled digital data item to the client via a broadcast as a broadcast scrambled digital data item, the broadcast scrambled digital data item including a plurality of broadcast control messages, each broadcast control message including broadcast control word generating information for generating a broadcast control word associated with the broadcast control message, the broadcast scrambled digital data item also including a plurality of segments of broadcast scrambled digital data, each segment of the broadcast scrambled digital data being associated with one of the plurality of broadcast control messages and being scrambled using the broadcast control word associated with the one of the broadcast control messages; stopping the providing of the broadcast scrambled digital data item; providing actual control messages to the client, wherein each actual control message includes control word generating information for generating a control word associated with the actual control message; and providing a further portion of the scrambled digital data item to the client, wherein the further portion of the scrambled digital data item includes a plurality of segments of scrambled digital data, each segment of scrambled digital data being associated with one of the actual control messages and being scrambled with the control word associated with the one of the actual control messages, and wherein the further portion of the scrambled digital data item further includes a plurality of reference control messages, each segment of scrambled digital data comprising one of the reference control messages, each of the reference control messages including a control message reference value identifying the actual control message associated with the segment of scrambled digital data.

There is also provided, according to another embodiment of the present invention, a method of storing a scrambled digital data item in a network, the method including: storing actual control messages in the network, wherein each actual control message is identified by a control message reference value, wherein each actual control message includes control word generating information for generating a control word associated with the actual control message; and storing the scrambled digital data item on a server in the network, the scrambled digital data item including a plurality of segments of scrambled digital data, each segment of scrambled digital data being associated with one of the actual control messages and being scrambled with the control word associated with the one of the actual control messages; wherein the scrambled digital data item is stored independently of the actual control messages, and wherein the scrambled digital data item further includes a plurality of reference control messages, each segment of scrambled digital data comprising one of the reference control messages, each of the reference control messages comprising a control message reference value identifying the actual control message associated with the segment of scrambled digital data.

According to another embodiment of the present invention, there is also provided a method of providing a scrambled digital data item to a client, the method including: storing the scrambled digital data item in a network according to the embodiment described above; providing all actual control messages associated with the scrambled digital data item to a client in a single control message file; and providing the scrambled digital data item to the client.

According to embodiments of the present invention, actual control messages that include information for generating control words used to scramble a digital data item are received and stored independently of the scrambled digital data item. The scrambled digital data item includes reference control messages that identify the actual control messages used to scramble the digital data item. In this way, the actual control messages for a scrambled digital data item can be recorded at a client device without the scrambled digital data item but the scrambled digital data item can still be decrypted once it is received at the client. Network (PVR) recording of scrambled video content can therefore be supported without requiring the network to support and maintain ECMs in the video content recording equipment (such as a VOD server). It is not necessary to modify the network video content recording equipment in order to support nPVR functionality and the level of integration necessary with network video content recording equipment is reduced. The amount of data manipulation that is carried out in network video content recording equipment is also reduced. Moreover, PVR functionality can be enabled for two audio/video streams in an IPTV network where there is limited final mile bandwidth by dropping one of the A/V streams but continuing to receive and storing the ECMs for the dropped stream.

BRIEF DESCRIPTION OF THE DRAWINGS

The present invention will be understood and appreciated more fully from the following detailed description, taken in conjunction with the drawings in which:

FIG. 12 is a message flow diagram showing a method for receiving and descrambling scrambled video content, according to embodiments of the present invention;

DETAILED DESCRIPTION OF EMBODIMENTS

Figure 1:
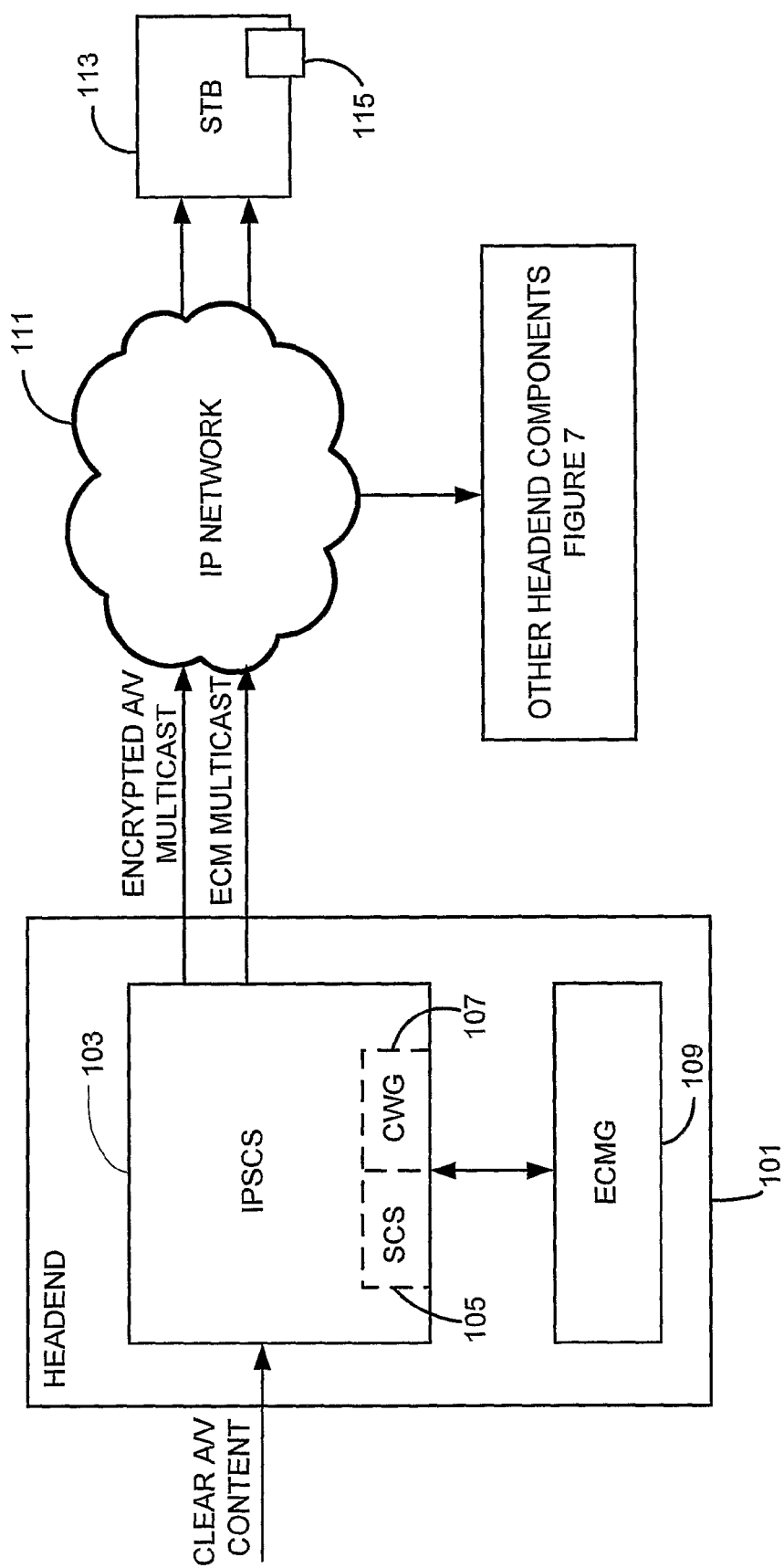
FIG. 1 is a simplified pictorial illustration of a broadband TV system constructed and operative in accordance with preferred embodiments of the present invention.

The following acronyms and definitions related to a television system will be useful to aid the understanding of the description that follows:

A/V—audio/video;

IP—Internet Protocol;

Moving Pictures Expert Group (MPEG)—industry standard developed by the "Motion Pictures Expert Group" working group of the International Standards Organisation (ISO) for video and audio source coding using compression and multiplexing techniques to minimize video signal bit-rate in preparation for broadcasting; including MPEG-2, MPEG-4 and other contemplated MPEG standards;

Transport Stream (TS)—an MPEG-2 multiplex with short fixed length packets carrying many programs intended for broadcast over potentially error-prone media, such as a satellite. A transport stream is a data structure defined in ISO/IEC 13818-1. It is the basis of the ETSI Digital Video Broadcasting (DVB) standards. A TS may correspond to a single TV programme, or multimedia stream. This type of TS is normally called a Single Programme Transport Stream (SPTS). An SPTS contains all the information required to reproduce the encoded TV channel or multimedia stream. In many cases, one or more SPTS streams are combined to form a Multiple Programme Transport Stream (MPTS). This larger aggregate also contains all the control information (Program Specific Information (PSI)) required to co-ordinate the DVB system, and any other data which is to be sent;

Digital Video Broadcasting (DVB)—a European project which has defined standards for digital television and datacasting across the range of delivery media. All DVB systems are based on MPEG-2 audio and video-compression. DVB adds to the MPEG transport stream multiplex the necessary elements to bring digital broadcast services to the home through cable, satellite, and terrestrial broadcast systems;

Conditional Access (CA) system—a system that controls, through the use of entitlement messages and control words, access to information or entertainment content transmitted to televisions or computers such that a television viewer or PC user is only able to view content for which they paid;

SimulCrypt—a mechanism whereby a single transport stream can contain several CA systems. This enables different CA decoder populations (potentially with different CA systems installed) to receive and correctly decode the same video and audio streams;

Entitlement Control Message (ECM)—a packet, created by an entitlement control message generator (ECMG), which contains information that the viewing card uses to determine the control word (or seed) which descrambles the picture;

Viewing card—a security device in a subscriber's home that receives and records entitlements and checks these against incoming program information. If the subscriber is authorized to view the current program, the card provides the control word to decrypt the content;

Set Top Box (STB)—a receiver unit, with an internal decoder, which is connected to a television set. It receives and demultiplexes the incoming signal and decodes and decrypts it when provided a control word by the viewing card;

Entitlement Management Message (EMM)—a packet containing private conditional access information which specifies the authorization levels or the services of specific decoders;

Control Word (CW)—the key used in the encryption or decryption of a data stream. In DVB Simulcrypt systems, the CW is generated by a Control Word Generator (CWG), and the resultant CW is provided to a multiplexer via the Simulcrypt Synchronizer (SCS). In a DVB system the CW is given by the SCS to the ECMG, which signals the CW in an ECM. The subscriber's viewing card derives the CW from the ECM and provides it to the STB for descrambling an authorized transmission;

Crypto Period (CP)—Typically only a few seconds long (e.g. 10s-30s), a crypto period is a regular time interval during which a particular CW is valid;

Entitlement Control Message Generator (ECMG) (also called the broadcast control centre (BCC))—assembles ECMs using program information received from the Simulcrypt Synchronizer. At the subscriber end, the viewing card uses these ECMs to determine the control words required for decrypting programs; Simulcrypt Synchronizer (SCS)—a logical component that acquires CWs and ECMs and synchronises their playout for multiple conditional access systems. The Simulcrypt aspect of the SCS is its ability to coordinate the use of one CW to encrypt content, while negotiating with one or more CA systems for the provision of ECMs based on that one CW, where each ECM is to be inserted into the stream, thus allowing simultaneous use of multiple CA systems. The SCS interfaces with the ECMG according to the protocol specified in ETSI TS 103 197 "DVB Simulcrypt—Headend Implementation". The SCS interfaces to other components (such as the CWG or multiplexer) are not specified by DVB and are likely to be proprietary (e.g. Tandberg SCS-SCS protocol);

Multiplexer—receives entitlement management messages (EMMs) from the authorization control centre (ACC), ECMs from the ECMG/broadcast control centre (BCC), video/audio data from the encoders, EPG data, and the SI stream from a service information generator (SIG). It then multiplexes them all into a single DVB-compliant transport stream, scrambles them according to the control words, and delivers the signal to the uplink after modulation. The multiplexer also contains the cipher card which scrambles the services according to the control words supplied by the ECMG/BCC;

Service Information (SI)—digital data describing the delivery system, content and scheduling/timing of broadcast data streams. SI data provides information to enable the set-top box to automatically separate and decode the various digital program streams; described in ETSI EN 300468 and ETSI TS 101211;

Authorization Control Centre (ACC)—the component of the conditional access headend that is responsible for the delivery of entitlements to the multiplexers. Acting on commands from the subscriber management system (SMS), the ACC creates Entitlement Management Messages (EMMs) for broadcast to the viewing cards or for relaying to Cable Operators. It then forwards the EMMs to the multiplexers. The ACC includes the subscriber database, which is a subset of the information held in the SMS database;

Subscriber Management System (SMS)—a system which handles the maintenance, billing, control and general supervision of subscribers to conditional access technology viewing services provided through broadcasting. An SMS can be an automatic system where subscribers order entitlements by entering information via a telephone. Alternatively, an SMS can be a manual system which requires subscribers to speak with an operator who manually enters their entitlement requests. Some systems support multiple SMSes;

IP Streaming Content Scrambler (IPSCS)—a system for translating MPEG-2 services from a broadcast network to a broadband network. IPSCS adapts up to four digital TV channels for real-time distribution over broadband IP networks. IPSCS is designed for live TV service delivery in a multicast IP environment. IPSCS can receive a DVB live TV stream reception from multiple ASI inputs, reduce video bit-rates, extract and reinsert program-specific information (PSI), extract Service Information (SI), forward SI to a web-based listing server, scramble content and interface with a CA system and perform IP encapsulation;

Network Management System (NMS)—provides central storage of all broadcast information and maintains the schedule of all broadcast services, event by event;

Video-On-Demand (VOD)—a method of providing video services to viewers under their control, permitting them to choose what they want to view and when;

Referring now to FIG. 1, a broadband TV system is shown in which clear (i.e. unscrambled) A/V content is received at headend 101. The clear A/V content is received as an MPEG-2 SPTS or MPTS. The clear A/V content is passed to IPSCS 103 for processing.

ECMs are created within ECMG 109 and delivered to IPSCS 103 via a DVB-Simulcrypt ECMG-SCS complaint interface as described in ETSI TS 103 197 (mentioned previously). A summary of the messages which directly impact the creation of ECMs will now be given. There are additional messages which are exchanged across the ECMG-SCS interface before the ECMG provides ECMs back to the SCS, but these are standard messages which do not directly impact the ECM generation and delivery process and therefore will not be described here. Details of these standard messages can be found in section 5 of ETSI TS 103 197.

Before any ECMs are generated, SCS 105 establishes a connection with ECMG 109. This is done using a Channel_Setup_Message, sent from SCS 105. The Channel_Setup_Message has a structure as shown in the table below:

| Syntax | Field Size/Type |
|---|---|
| Channel_Setup_Message ( ) | |
| ECM_Channel_ID | 2 bytes |
| Super_CAS_ID | 4 bytes |

Super_CAS_ID: This identifies the "owner" of the CA system, i.e. the ECMG used to create the ECMs, i.e. ECMG 109. The Super_CAS_ID value is pre-configured at the SCS associated with IPSCS 103, i.e. SCS 105. The upper 16-bits of this value shall be set to the CAS_ID value which IPSCS 103 is using for the ECM stream for that particular service. The lower 16-bits (CA_Subsystem_ID) are not used and are set to zero.

ECM_Channel_ID: Allocated by the SCS function. It uniquely identifies an ECM channel across all connected ECMGs. This parameter is not re-used in the ECMs or RECMs.

Once communications have been established between SCS 105 and ECMG 109 for a particular ECM channel, IPSCS 103 generates the CWs to be used for each crypto period within the corresponding encrypted service. This is typically done by CWG 107 that is incorporated within IPSCS 103. Preferably, IPSCS 103 is configurable to support 64-bit CW operation and 128-bit CW operation. Each CW is then passed to the associated SCS 105 (also typically implemented within IPSCS 103), which forwards them to ECMG 109 within a CW_Provision_Message. The CW_Provision_Message has a structure as shown in the table below:

| Syntax | Field Size/Type |
|---|---|
| CW_Provision_Message ( ) | |
| ECM_Channel_ID | 2 bytes |
| ECM_Stream_ID | 2 bytes |
| CP_Number | 2 bytes |
| CP_CW_Combination | 10-bytes (64-bit CW) |
| | 18 bytes (128-bit CW) |
| Access_Criteria | Variable |

ECM_Stream_ID: Allocated by the SCS function and uniquely identifies an ECM stream within a particular ECM channel. This parameter is not re-used in the ECMs.

CP_Number: Refers to a particular crypto period (CP) within an encrypted service and allows CW Provisioning Messages and ECM Response Messages to be linked to the service being scrambled. CP_Number is assigned by the SCS function. The CP_number shall have the same parity as the corresponding ECM/CW pair. This parameter is not re-used in the ECMs.

CP_CW_Combination: A concatenation of CP_Number (typically, the most significant two bytes) and the corresponding actual CW for that crypto period. For DVB-CSA scrambling, the CW is 8-bytes long. AES and NSA scrambling use 16-byte CWs, but since legacy ECMGs do not support such a large CW, the value sent in the CW_Provision_Message is configurable as either 8-bytes (for legacy-based systems) or 16-bytes (for 128-bit CW capable systems). The CW is encoded into the corresponding ECM and sent in an ECM_Response_Message (which will be described in more detail below). For legacy (8 byte CW) systems using AES or NSA scrambling, the CW at IPSCS 103 is extended to 16-bytes to form the encryption key). There is one CP_CW_Combination per CW_Provision_Message, i.e. lead_CW=0 and CW_Per_Msg=1.

Access_Criteria: Contains a low level access criteria expression string.

In response to the CW_Provision_Message, ECMG 109 returns an ECM to SCS 105 within an ECM_Response_Message. The ECM_Response_Message has a structure as shown on the table below:

| Syntax | Field Size/Type |
|---|---|
| ECM_Response_Message ( ) | |
| ECM_Channel_ID | 2 bytes |
| ECM_Stream_ID | 2 bytes |
| CP_Number | 2 bytes |
| ECM_Datagram | variable |

ECM_Datagram: This field conveys the actual ECM which is used to construct ECMs. The ECM Datagram received from ECMG 109 is formatted as an MPEG-2 CA Table Section, as follows:

| Syntax | Field Size/Type | Value |
|---|---|---|
| CA_Message_Section( ) | | |
| Table_ID | 8-bits binary | 0x80 or 0x81 |
| Section Syntax Indicator | 1-bit binary | "0" |
| DVB_reserved | 1-bit binary | "1" |
| ISO_reserved | 2-bit binary | "11" |
| CA_Section_Length | 12-bits binary | variable |
| ECM_Payload | variable-bytes binary | variable |

Table_ID: Identifies the table section as a DVB CA Message Table. Values of 0x80 and 0x81 are used alternately to denote "Even" and "Odd" parity ECMs respectively.

Section_Syntax_Indicator: Defined by DVB and is set to zero.

DVB_Reserved/ISO_Reserved: Standards body reserved bits which shall are set to one.

CA_Section_Length: Indicates the length of the remaining part of the table section, i.e. the length of the ECM_Payload.

ECM_Payload: This field conveys the actual ECM. This may be a proprietary and complex data structure, designed for decoding only by specific viewing cards and associated verifiers.

An ECM/CW pair is activated at IPSCS 103 by SCS 105 using a local timing source in conjunction with pre-loaded service configuration data, or by the detection of pre-defined events occurring within the input service stream. The timing of ECM requests to ECMG 109 is not usually locked precisely to the actual crypto period timing within the outgoing streams, i.e. each ECM may be requested ahead of time and cached locally within IPSCS 103 until it is used.

There may be instances, e.g. during a viewing card changeover period, when more than one CAS_ID is active within the system. In such cases, multiple ECM streams are generated for each service. This will in turn mean that IPSCS 103 connects to multiple ECMGs. For each crypto period within the content, the same CW is supplied to each ECMG within the respective CW_Provision_Messages, but different ECMs are returned within the corresponding ECM_Response_Messages. Each ECM source is used to produce a separate ECM stream at the output of the encryption device.

Referring once again to FIG. 1, IPSCS 103 uses ECMs generated by ECMG 109 to encrypt the incoming clear A/V content and multicasts the resultant encrypted A/V data to STB 113 via IP network 111. In preferred embodiments of the present invention, a separate, "out-of-band" (OOB) ECM stream is used to send the ECMs to STB 113 and therefore IPSCS 103 also delivers OOB ECMs to STB 113 via IP network 111 but on a different multicast to that on which it delivers the encrypted A/V content.

The structure, carriage and playout of the OOB ECMs delivered to STB 113 will now be described. It should be noted that in-band ECMs may also be delivered within the A/V SPTS in addition to the OOB ECMs.

For real-time streaming services, OOB ECMs are delivered to clients in a binary format via a UDP/IP channel. IPSCS 103 sends the ECMs out on a different multicast to which it is sends out the MPEG-2 Transport Stream.

The ECMs are delivered as binary coded DVB/MPEG-2 CA Table Sections, with additional header information as described below. Only one ECM is delivered per UDP datagram. The ECMs are re-transmitted continuously at a user/system configurable rate (typically, 200 mSec) in order to allow a client receiver to join a multicast streaming service at any time.

At a crypto period changeover, transmission of the new ECM begins a predetermined period of time (e.g. at least 500 milliseconds, typically 1 second) before the first use of the corresponding CW. This provides time for the receiver to compute and cache the next CW. Transmission of the ECM for the current crypto period does not cease more than a predetermined period of time (e.g. 3 seconds, but typically 1 second) prior to the end of this crypto period in order to limit the window during which a receiver newly joining a multicast stream is unable to acquire the current ECM and decrypt that stream. The actual ECM start/stop periods are determined by the Delay_Start and Delay_Stop parameters configured within IPSCS 103.

The following table defines the format of an OOB ECM Datagram when sent as a binary coded DVB/MPEG-2 CA Table Section within the payload of a UDP packet. Additional parameters are conveyed within the UDP packet payload, but outside of the CA Table Section structure.

| Syntax | Field Size/Type | Value |
|---|---|---|
| Version_Number | 8-bits | 0x01 |
| NDS_Reserved | 8-bits | 0x00 |
| CAS_ID | 16-bits | Variable |
| ECM_Reference_Value | 12-bytes | Variable |
| CA_Message_Section ( ) | | |

Version_Number: Defines the OOB ECM protocol version. This is a system wide static parameter and is pre-defined by the platform build standard. In the present embodiment, this defines version 1 (0x01) of the binary formatted OOB protocol.

NDS_Reserved: Used as padding to long-word align the ECM Datagram CA table section structure within the UDP payload envelope and is set to zero.

CAS_ID: This is the CA System Identifier and identifies the "owner" of the CA system used to encrypt the service. This is assigned as part of the service configuration, e.g. as part of IPSCS 103 setup, and sent to ECMG 109 in the most significant 16-bits of the Super_CAS_ID field within the Channel_Setup_Message, as described above. This parameter may be pre-defined on a per service basis, though all services originating from a single service provider use the same CAS_ID.

If there is more than one CAS_ID active within the broadband TV system, e.g. during a viewing card changeover period, then separate UDP Datagram ECM streams are delivered for each CAS_ID. The default OOB ECM stream is preferably delivered on UDP port 2000 (decimal), although the port number is preferably system configurable. Additional ECM streams associated with a service/content stream are each delivered on a different system configurable UDP port, typically decimal 2001, 2002, etc. (Port 554 is reserved for RTSP).

Since the ports are system configurable at the head-end, the mapping of CAS_ID to ECM/UDP port number is signalled to STB 113. This is implemented via the EPG system as part of the service/content locator signalling. Signalling the mapping via the EPG (rather than via CA descriptors within the PMT) allows the ECM port to be determined and opened as part of the session setup sequence ahead of the actual content acquisition.

ECM_Reference_Value: This is a globally unique identifier assigned to each OOB ECM and is constructed such that the probability of any two ECMs being assigned the same identifier is virtually zero across all deployed broadband TV systems. However, all ECMs relating to the same content crypto period shall have the same ECM_Reference_Value. (The ECM_Reference_Value is also assigned to a Reference ECM (RECM) associated with the ECM. The RECM is inserted as an "in-band" stream into the encrypted A/V content stream instead of (or in addition to) the conventional broadcast ECM packet stream. The RECM helps synchronise the OOB ECMs with the original A/V stream. The RECM also conveys a pointer to the actual ("true") ECM. RECMs will be described in more detail below.)

The ECM_Reference_Value is a 12-byte parameter composed of the following sub-fields:

| Syntax | Field Size/Type | Value |
| --- | --- | --- |
| ECM_Reference_Value ( ) | | |
| SCS_MAC_Address | 48-bits binary | variable |
| SCS_Channel_Number | 16-bit binary | variable |
| Time_Offset | 32-bit binary | variable |

SCS_MAC_Address: This is the MAC Address of the network interface used by the SCS function within IPSCS 103 to receive the corresponding ECMs from the ECMG 109, i.e. the client end of the DVB Simulcrypt ECMG-SCS interface. Typically this is the MAC address of the Ethernet interface installed within IPSCS 103.

SCS_Channel_Number: This is a service or content specific number within the scope of SCS and is used to differentiate between OOB ECMs created for each "channel" within a multi-channel SCS. This field ensures that where a single SCS platform simultaneously controls the scrambling of multiple streams, the ECM Reference Values always remain unique.

Time_Offset: This is the instantaneous value of an incrementing real-time counter within the SCS platform sampled at the time the ECM Reference Value is assigned. The resolution of this timer shall be very much smaller than the frequency with which OOB ECMs are created for any given service or content item (i.e. per channel number). This frequency is not necessarily the same as the crypto period duration, since ECM creation may be performed in batches ahead of them being used by the encryption process. Typically, this timer has a resolution and incrementing interval in the millisecond range; does not wrap around in less than 5 years and is not reset in the event of an SCS platform reset/re-boot or by power cycling.

Where an NTP time source is available within the system, the Time_Offset should be assigned instantaneous values corresponding to the 32-LSBs of this timer.

CA_Message_Section: This is the actual OOB binary ECM Datagram forwarded by SCS 105 that directly controls the scrambling of the associated IP streaming service. It is an exact copy of the corresponding binary CA_Message_Section received from ECMG 109 via the ECMG-SCS interface. The ECMs shall be continuously carouselled in a separate OOB multicast UDP/IP stream, in order to allow receivers to "tune-in" at any time.

Each new ECM can start carouselled transmission any time during the previous crypto period, up to half a second (for example) before crypto period changeover. The current ECM preferably does not cease multicasting more than a few seconds (e.g. 3 secs) ahead of the crypto period changeover otherwise a receiver trying to join the multicast service at that time will have to wait an excessive amount of time until the next crypto period before it can begin decrypting the service. This is illustrated in the top half of FIG. 2, which shows the extreme timing limits of a transmission scheme for carouselled OOB ECM streams.

Figure 2:
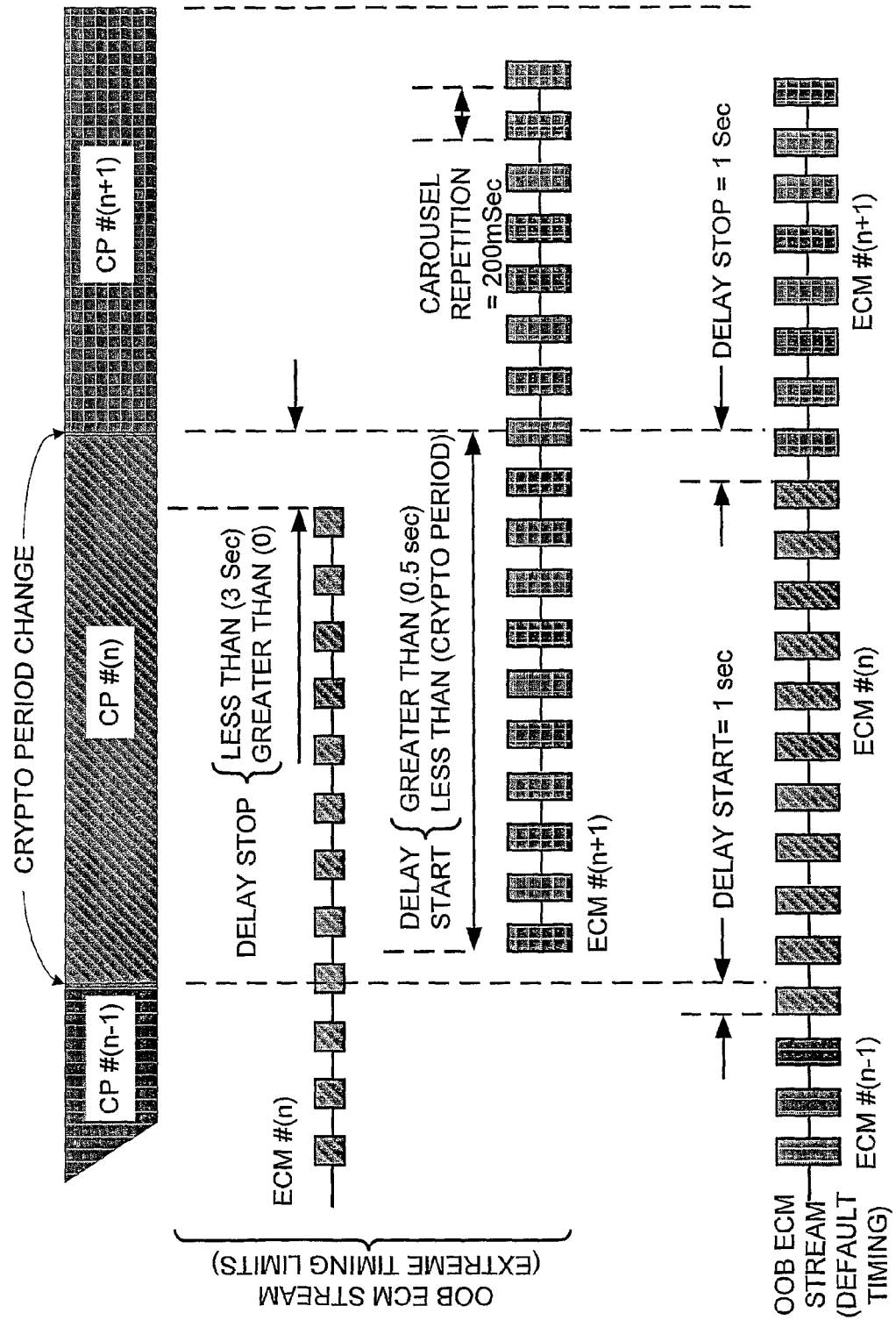
FIG. 2 is an illustration of a transmission scheme for carouselled out-of-band ECMs according to embodiments of the present invention.

FIG. 2 also illustrates that it is possible to overlap the carouselled transmission of ECMs for successive crypto periods. However, the system settings are typically set such that this will not happen, as shown by "default timing" in the bottom half of FIG. 2.

As mentioned above, the true ECMs used in embodiments of the present invention are preferably delivered in OOB mode. However, there may be system environments/stream applications where it is desirable to deliver the true ECMs in-band as part of the A/V SPTS, or both in-band and out-of-band.

IPSCS 103 is configured to support both in-band and OOB ECM streams, and is configurable in all combinations, i.e. mode 0=OOB ECM, mode 1=IB ECM, mode 2=OOB and IB ECM.

The format and delivery mechanism for "in-band" ECMs will now be described in more detail.

For real-time streaming services, in-band ECMs are delivered to clients in a binary format multiplexed into the A/V SPTS. The ECMs are delivered as binary coded DVB/MPEG-2 CA Table Sections, carried in an MPEG-2 TS packet. Only one ECM is delivered per TS packet. The ECMs are re-transmitted continuously at a user/system configurable rate (with a typical default value of 200 mSec) in order to allow a client receiver to join a multicast streaming service at any time.

At a crypto period changeover, transmission of the new ECM preferably begins at least 500 milliseconds before the first use of the corresponding CW, with a typical default value of 1 second. This provides time for the receiver to compute and cache the next CW. Transmission of the ECM for the current crypto period preferably does not cease more than 3 seconds prior to the end of this crypto period, with a typical default value of default 1 second. This is to limit the window during which a receiver newly joining a multicast stream is unable to acquire the current ECM and decrypt that stream. The actual ECM start/stop periods are determined by the Delay_Start and Delay_Stop parameters configured within IPSCS 103. This mechanism allows the STB to simply use ECMs in an odd/even manner (as received in the stream). This technique does not use the ECM_Reference_Value to identify the arrival of new ECMs.

The in-band ECM follows the same formatting convention as the RECM described above. The PID used to convey the in-band ECMs is signalled via a CA Descriptor within the PMT of the scrambled stream (see below) in addition to the RECM's CA descriptor. Only one ECM is carried per TS packet. The format is defined in the following table:

| Syntax | Field Size/Type | Value |
| --- | --- | --- |
| ECM_TS_Pkt ( ) | | |
| MPEG-2 TS Packet Header ( ) | | |
| Sync_Byte | 8-bits binary | 0x47 |
| Transport_Error_Indicator | 1-bit binary | Set to "0" |
| Payload_Unit_Start_Indicator | 1-bit binary | Set to "1" (New table section starts in TS packet) |
| Transport_Priority | 1-bit binary | Set to "0" |
| PID | 13-bit binary | System configurable - default = 0x0501 |
| Transport_Scrambling_Control | 2-bits binary | Set to "00" (clear mode) |
| Adaptation_Field_Control | 2-bits binary | Set to "01" (payload only) |
| Continuity_Control | 4-bits binary | Incrementing modulo-16 count |
| Pointer_Field | 8-bits binary | Set to "0x00" (New table section starts next byte) |
| CA_Message_Section ( ) | | |
| Table_ID | 8-bits binary | 0x80 or 0x81 |
| Section_Syntax_Indicator | 1-bit binary | "0" |
| DVB_reserved | 1-bit binary | "1" |
| ISO_reserved | 2-bit binary | "11" |
| CA_Section_Length | 12-bits binary | variable |
| ECM_Payload | variable binary | variable |

Carousel timing for in-band ECMs is preferably identical to that for the out-of-band ECMs.

The concept of a Reference ECM (RECM), including its structure, delivery and timing will now be described in more detail.

As mentioned previously, an RECM is a new MPEG-2 transport packet type that is inserted as an "in-band" stream into an encrypted stream instead of (or in addition to) the ECM packet stream. The RECM helps synchronise the OOB ECMs with the original A/V stream. The RECM also conveys a pointer to the actual ("true") ECM.

This then allows the CW for any segment of encrypted content to be recovered in any circumstance, i.e. it maps the true ECMs (when carried in an "Out-Of-Band" UDP stream) to specific crypto periods within their encrypted content stream. For each crypto period, all RECM packets contain the same reference value.

The RECMs also marks the boundary between different crypto periods. A crypto period boundary is identified by a change in the ECM_Reference_Value (the pointer value) within the RECM stream. Whilst the toggling of the MPEG-2 specified Transport_Scrambling_Control (TSC) parity flags in the A/V packet headers is sufficient to mark crypto period changeover in linearly viewed content it is inadequate if the content is later re-used in a trick mode playout. This is exacerbated where encrypted content has been subsequently segmented and spliced together or where stream switching occurs within the IP network.

In such cases, it is possible for the STB to receive encrypted MPEG A/V streams containing adjoining crypto periods with the same TSC parity. Therefore, receivers should always sample the ECM_Reference_Values rather than relying solely on tracking the parity value of the TSC flags in the A/V packets. Although RECM signalling mitigates against TSC parity errors, typically the encryptor also generates valid TSC parity signalling in the MPEG-2 TS packet headers.

RECMs can be inserted into TSs containing any video/audio codec, though the specific insertion point is dependent upon the picture structure of the video codec. The RECM is inserted at the start of each "video access point" from a decoder's perspective (e.g. at start of each I-frame for MPEG-2 video). The RECM inserted against the video component is also used as the reference for the audio component. The RECMs can also be used for encryption of data components, by referencing the RECM position in the video component across to both the audio and data components. It is likely that multiple RECMs (with same ECM_Reference_Value) will be sequentially inserted into a content stream during a single crypto period and this is dependent on the relationship between the video codec picture sequence/structure and the configured crypto period duration.

For encrypted audio only streams (e.g. IP radio services), an RECM is inserted into the MPEG-2 TS at the start of each audio PES header (immediately after the TS packet containing the audio PES header). Crypto period changes are PES aligned. The RECMs can also be used for encryption of data components, by referencing the RECM position in the audio component across to the data component.

For encrypted data-only streams (e.g. interactive TV data object carousel), the random access and splicing requirements important to A/V streams are much less critical due to the repetitive nature of data streams and their inherent display latency (they must be processed by a client application). However, these streams can still be handled by this encrypted stream format. An RECM is typically inserted into the MPEG-2 TS every 200 ms or after the next TS packet containing a new table section (payload_unit_start_indicator=1), whichever comes later.

RECMs are constructed in a similar way as regular ECMs, using DVB/MPEG-2 CA Table Sections. These table sections are further encapsulated into MPEG-2 transport packets prior to insertion into the content stream. The PID used to convey the RECMs is signalled via a CA Descriptor within the PMT of the scrambled stream (see later). An RECM is wholly contained within a single TS packet and only one RECM is carried per TS packet. The format is defined in the table below:

| Syntax | Field Size/Type | Value |
| --- | --- | --- |
| ECM_Reference_TS_Pkt ( ) | | |
| MPEG-2 TS Packet Header ( ) | | |
| Sync_Byte | 8-bit binary | 0x47 |
| Transport_Error_Indicator | 1-bit binary | Set to "0" |
| Payload_Unit_Start_Indicator | 1-bit binary | Set to "1" (New table section starts in TS packet) |
| Transport_Priority | 1-bit binary | Set to "0" |
| PID | 13-bit binary | Defaults to |

-continued

| Syntax | Field Size/Type | Value |
|---|---|---|
| | | 0x0500, but system configurable. There shall only ever be one RECM PID within an encrypted content transport stream. |
| Transport_Scrambling_Control | 2-bit binary | Set to "00" (clear mode) |
| Adaptation_Field_Control | 2-bit binary | Set to "01" (payload only) |
| Continuity_Control | 4-bit binary | Incrementing modulo-16 count |
| Pointer_Field | 8-bit binary | Set to "0x00" (New table section starts next byte) |
| CA_Message_Section ( ) | | |
| Table_ID | 8-bit binary | 0x80 or 0x81 |
| Section_Syntax_Indicator | 1-bit binary | "0" |
| DVB_reserved | 1-bit binary | "1" |
| ISO_reserved | 2-bit binary | "11" |
| CA_Section_Length | 12-bit binary | 0x011. i.e. total RECM length = 17. |
| ECM_Reference_Packet | 17-bytes | variable |
| TS_Packet_Stuffing_Bytes | 163-bytes | 0xFF |

MPEG-2 TS Packet Header: The sub-fields within this comply with the format, rules and values defined in ISO/IEC 13818-1. The values that shall be assigned to each field are shown in the table.

Table_ID: The same as the value in the corresponding (actual) ECM, i.e. "0x80" or "0x81". This field can be used to identify the odd/even scrambling parity of the corresponding crypto period within the service/content. The ECM_Reference_Packet parity also matches the setting of the Transport_Scrambling_Control (TSC) bits for the corresponding crypto period within each of the associated scrambled elementary video/audio streams.

Section_Syntax_Indicator: Set to zero indicating a short table section header.

CA_Section_Length: Indicates the length, in bytes, of the remaining part of the table section, i.e. the length of the RECM.

ECM_Reference_Packet: This field conveys the actual RECM and has a structure comprising the following fields and values:—

| Syntax | Field Size/Type | Value |
|---|---|---|
| ECM_Reference_Packet ( ) | | |
| Preamble | 4-bytes | 0x00 00 08 0C |
| ECM_Reference_Value | 12-byte binary | variable |
| Postamble | 1-byte | 0x00 |

ECM_Reference_Value: This is a globally unique identifier assigned to each RECM/OOB ECM (as described previously).

The presence of the RECMs within an encrypted Single Program Transport Stream (SPTS) serves two purposes. Firstly, it provides a pointer (via the ECM_Reference_Value) to the corresponding 'true' ECM (for OOB-ECM streams) from which the CW for the current crypto period can be computed. Secondly, it marks the boundaries between crypto periods within the encrypted content streams. This latter purpose is satisfied by carefully controlling the positioning of the RECMs within the SPTS structure of the encrypted service.

It is highly desirable to permit random access into previously encrypted content to allow for trick mode operation within VOD applications. In addition, support for the segmentation of content streams and the subsequent re-assembly of re-ordered segments from multiple source material into logical content sequences after the content has been encrypted is also desirable. In order to permit this "cutting and splicing" to be done at any valid video "access point", the stream encryption and associated signalling are aligned to the underlying video structures, i.e. both the stream scrambling and the CA signalling functions are "content aware". In preferred embodiments, these desirables can be achieved by applying the following preferred recommendations:

1. Crypto Periods only change at the start of a video access point (e.g. I-frame for MPEG-2 video) for video-led services, or at the start of an audio access point for audio-led services. For MPEG-2 video, this means that for most cases the crypto periods are also GOP aligned though this is not necessarily the case. However, any preceding packets between the start of a GOP header and the start of an associated I-frame will be left in the clear (see recommendation 6 below) and hence the crypto period may be treated as if it started at the GOP header. For advanced codecs this means the CPs are aligned to self-contained picture sequences. For data-led services there is no restriction on the CP boundaries.

2. The 'true' ECMs are delivered ahead of the crypto periods to which they relate. Preferably this is a configurable period with a typical default value of 1 second in advance.

3. The RECM is contained within the bounds of the crypto period to which it relates, i.e. it is not inserted into the stream during the previous crypto period, as is commonly done for in-band ECMs in traditional DVB-based CA systems.

4. Every video sequence starting at one access point (e.g. I-frame in MPEG-2 video) and ending immediately prior to the next access point is "self contained", including the CA signalling needed to decrypt it. An RECM is therefore inserted into the TS multiplex immediately after the first MPEG-2 TS packet containing a video access point (for video-led services) or audio access point (for audio-led services) irrespective of whether there is a crypto period changeover or not within the original content. When content segmentation and splicing is performed subsequent to encryption (including within special trick mode files), any access point may end up on the boundary between two crypto periods (e.g. in MPEG-2, an encrypted GOP that was originally in the middle of a CP may now be the start of a CP). For MPEG-2 video, in most cases an I-frame to I-frame video sequence will also correspond to a GOP sequence, though this need not necessarily be so, since GOP sequence headers are optional within MPEG streams. For advanced codecs this translates to the video sequence between successive access points in the picture stream being self-contained encryption-wise.

5. Starting at the first TS packet of each access point, all elementary streams within the TS multiplex are left in "clear" mode for a system configurable time period. This is irrespective of whether there is a crypto period changeover or not. This "clear mode window" typically does not exceed 3 mSec. This recommendation is conditional on recommendation 6 below. The duration of the "clear mode window" is dependent on the performance of the client receivers, so may be tuned down to 0s. This clear window is designed to allow time for ECM_Reference_Value checking and CW lookup/loading at the STB. Where the STB implementation uses a completely sequential stream demultiplexing and processing method, it is possible to set this window near to zero (subject to recommendation 6 below).

6. All transport packets containing any part of the Video "Sequence Headers", "GOP Headers", "Picture Headers" and "PES Headers" remain in clear mode. All transport packets containing any part of the audio "PES Headers" also remain in clear mode. Where the video or audio headers exceed the configured "clear mode window" duration, this takes precedence over recommendation 5 above. This ensures that encrypted picture sequence boundaries (e.g. MPEG-2 GOP transitions) are 'visible' even if the boundary occurs in the middle of a TS packet (as the boundary packet will be left in the clear). Leaving audio PES headers in the clear accommodates some STB designs that use the audio stream to derive timing information prior to decryption.

7. The Transport_Scrambling_Control bits in all elementary streams comply with the MPEG and DVB rules, i.e. they indicate the correct scrambling polarity, or clear mode, as applied to the TS packet payload.

When content is encoded or re-encoded (e.g. such as during bit rate changing), the encoding process is preferably designed to ensure that the video access points are transport packet aligned. The choice of video codec does not alter where RECM packets are placed. RECM packets are preferably placed immediately after the first packet containing data that forms a random access point (an entry point into the stream from which decoding can start without requiring information that has previously been transmitted.

As a non-limiting example, RECM placement for MPEG-2 video will now be described in more detail.

MPEG-2 video streams are characterised by their I-frames being the entry point into a stream for a decoder, for splicing content or for performing trick modes (jumps/chapterisation etc.). MPEG-2 video may contain P-frames and B-frames, but these cannot be used as an entry point and hence cannot be used as a RECM insertion point.

Following recommendations 1 and 4 described above, IPSCS 103 detects the start of each I-frame payload in the video PES and inserts the RECM packet immediately after the first TS packet containing I-frame payload. The detection of I-frame starts is achieved by examining video sequence headers down to the picture headers (picture_coding_type—see table below).

| picture_coding_type | coding method |
|---|---|
| 000 | Forbidden |
| 001 | Intra-coded (I) |
| 010 | Predictive-coded (P) |
| 011 | Bidirectionally-predictive-coded (B) |
| 100 | Shall not be used |
| 101 | Reserved |
| 110 | Reserved |
| 111 | Reserved |

Note that the sequence header is only optionally followed by a GOP header, so the GOP header is unsuitable for reliably detecting I-frame starts.

In summary, IPSCS 103 examines the following path to discover an I-frame:
PES packet: packet_start_code_prefix=0x000001+stream_id of 1110xxxx [i.e. 0xE0 to 0xEF] (MPEG-2 video stream)
Video Sequence->Sequence header: sequence_header_code=0x000001B3
Sequence header->Picture header: picture_start_code=0x00000100
Picture header->picture_coding_type=001 (I-frame)

Figure 3:
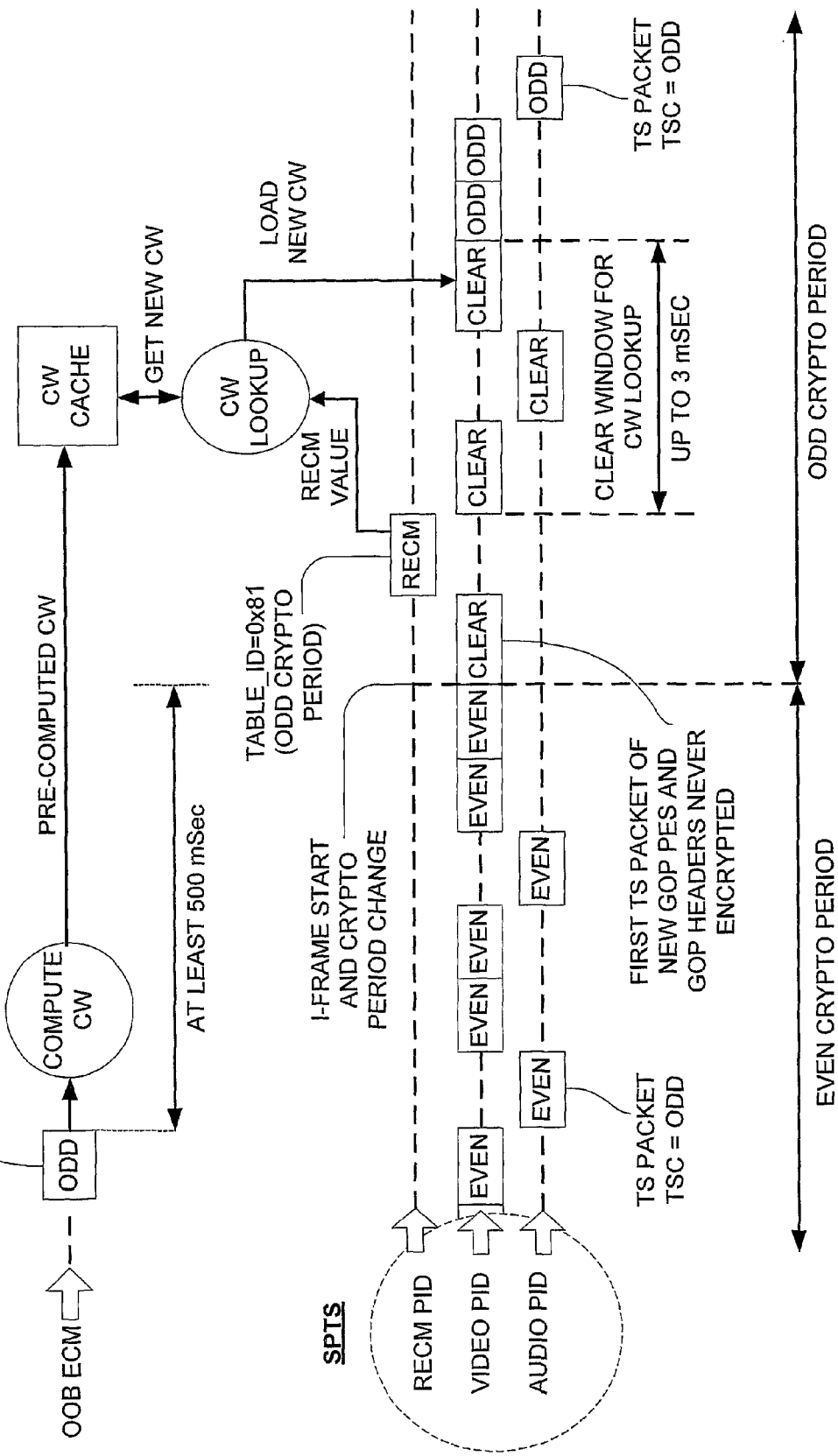
FIG. 3 is an illustration of the placement of reference ECMs in a transport stream according to embodiments of the present invention.

FIG. 3 illustrates how RECM insertion, video access point marking and crypto period delineation is carried out by the receiving device. The diagram shows (for an OOB ECM case) how the RECM is used at a typical crypto period changeover.

Where there is no crypto period change at an RECM (for most codecs there will be several access points, and hence RECMs, within a crypto period), the result of the ECM_Reference_Value lookup will return the same CW as already loaded. In this case the client receiver may proceed to overwrite the existing CW with the same CW, or the CW load process may be skipped.

For real-time streaming services, the first transmission of the true ECM for a new crypto period is typically at least 500 milliseconds ahead of the crypto period start, as shown in FIG. 3. The true ECM is transmitted repeatedly (carouselled) during the crypto period, in order to allow receivers to "tune into the service" at any time. Transmission of the true ECM for each crypto period does not typically cease more than 3 seconds prior to the end of the crypto period in order to minimise the period during which a newly "tuned" channel cannot be decrypted.

The ciphers that may be used to perform the TS packet level encryption described above, and their application within the RECM-based stream will now be described starting with Advanced Encryption Standard—Electronic Code Book (AEB-ECB) as described in NIST PIPS PUB 197 "*Specification for Advanced Encryption Standard*" and NIST SP800-38A "*Recommendations for Block Cipher Modes of Operation (AES)*", the disclosures of which are hereby incorporated by reference herein.

The AES algorithm is a symmetric block cipher which operates on data in blocks 16 bytes (128 bits) in length. AES is used with keys of 128 bits (16 bytes) in length.

However, many legacy CWGs and viewing cards only support 64-bit control words. In such legacy systems each 64-bit control word produced by a CWG/viewing card is expanded into a 128-bit AES key. Also, as the transport packet payload length is not an exact multiple of 16 bytes, some of each packet's payload cannot be encrypted. However, the amount of data left unencrypted can be minimised, and this is defined below along with the format of encrypted packets.

Encryptors are configurable to support both true 128 bit and 64 bit "Control word expansion" modes of operation.

Preferably, AES is used in AES-128 key mode (128 bit key length). Electronic Codebook (ECB) confidentiality mode is used to perform encryption/decryption. This means that each block of ciphertext is dependent only on the corresponding plaintext block and current cipher key, minimising decryption load on the STB and permitting parallel computation of multiple forward block ciphers in the content scrambler (and parallel inverse ciphers at STB, if feasible).

Figure 4:
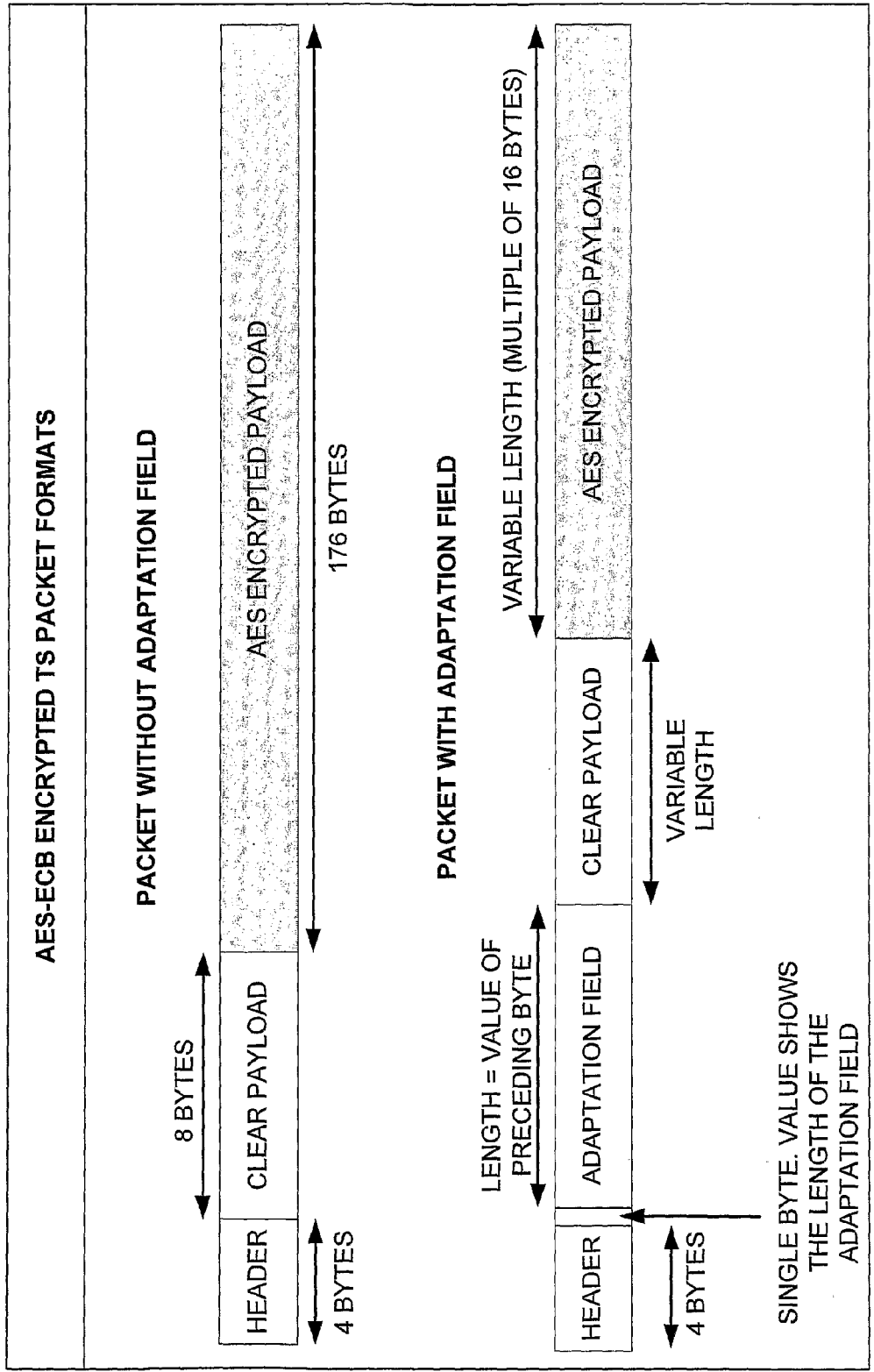
FIG. 4 is an illustration of the format of AES-ECB scrambled transport stream packets according to embodiments of the present invention.

FIG. 4 shows the format of AES-ECB scrambled TS packets. The encryption recommendations described above are preferably adhered to. Also, when a transport packet is encrypted, the first 12 bytes (packet header+first 8 bytes of packet content) are left in the clear.

If the Adaptation Field Control bits indicate the packet contains an adaptation field, the adaptation field itself must also be left in the clear (see ISO/IEC 13818-1 section 2.4.3.3). The length of the adaptation field can be determined by examining the first byte after the end of the packet header, and as many bytes as possible (allowing for the AES block size constraint) after the end of the adaptation field shall be encrypted.

When a TS packet is scrambled, the portion of the packet payload which is encrypted depends on the Adaptation Field Control bits in the packet header. These will show the packet either has no adaptation field, or has an adaptation field and no payload, or has both an adaptation field and payload.

This gives rise to the following preferred TS packet scrambling rules:
If the adaptation field control bits in the packet header show the packet contains no adaptation field:
   The first 12 bytes of the transport packet are left in clear, and the final 176 bytes are encrypted.
   The Transport Scrambling Control bits in the packet header are set depending on the current control word polarity.
If the adaptation field control bits in the packet header show the packet contains an adaptation field and no payload:
   None of the packet is encrypted.
   Both the Transport Scrambling Control bits in the packet header are cleared to indicate the packet is unscrambled.
If the adaptation field control bits in the packet header show the packet contains both an adaptation field and payload:
   Examine the byte immediately following the packet header, which shows the length of the adaptation field.
   Calculate the number of bytes in the payload:
   payload_length=184−(1+adaptation_field_length).
      If payload_length<16 bytes:
         None of the packet is encrypted.
         Both the Transport Scrambling Control bits in the packet header are cleared to indicate the packet is unscrambled.
      If there are 16 bytes of payload, calculate the number of bytes of payload which are left in clear:
         clear_payload_length=payload_length MOD 16
         the first (5+adaptation_field_length+clear_payload_length) bytes of the packet are left in the clear
         the final (payload_length−clear_payload_length) bytes are encrypted.
         the Transport Scrambling Control bits in the packet header are set depending on the current control word polarity.

The recommended operation of a DVB Common Scrambling Algorithm (DVB-SCA) scrambler will now be described.

DVB-CSA (see ETSI ETR 289 "*DVB: Support for Use of Scrambling and CA in Digital Broadcasting Systems*, the disclosure of which is hereby incorporated by reference herein) is a symmetric stream cipher which therefore operates on data in a bitwise fashion. DVB-CSA uses keys of 64 bits (8 bytes) in length. This matches the length of a standard CWG and viewing card control word.

As a result each 64-bit control word produced by a CWG/viewing card can be used directly as the 64-bit DVB-CSA key. Also, as DVB-CSA is a stream cipher, the transport packet payload length has no effect. All payload that is required to be encrypted can be encrypted.

Figure 5:
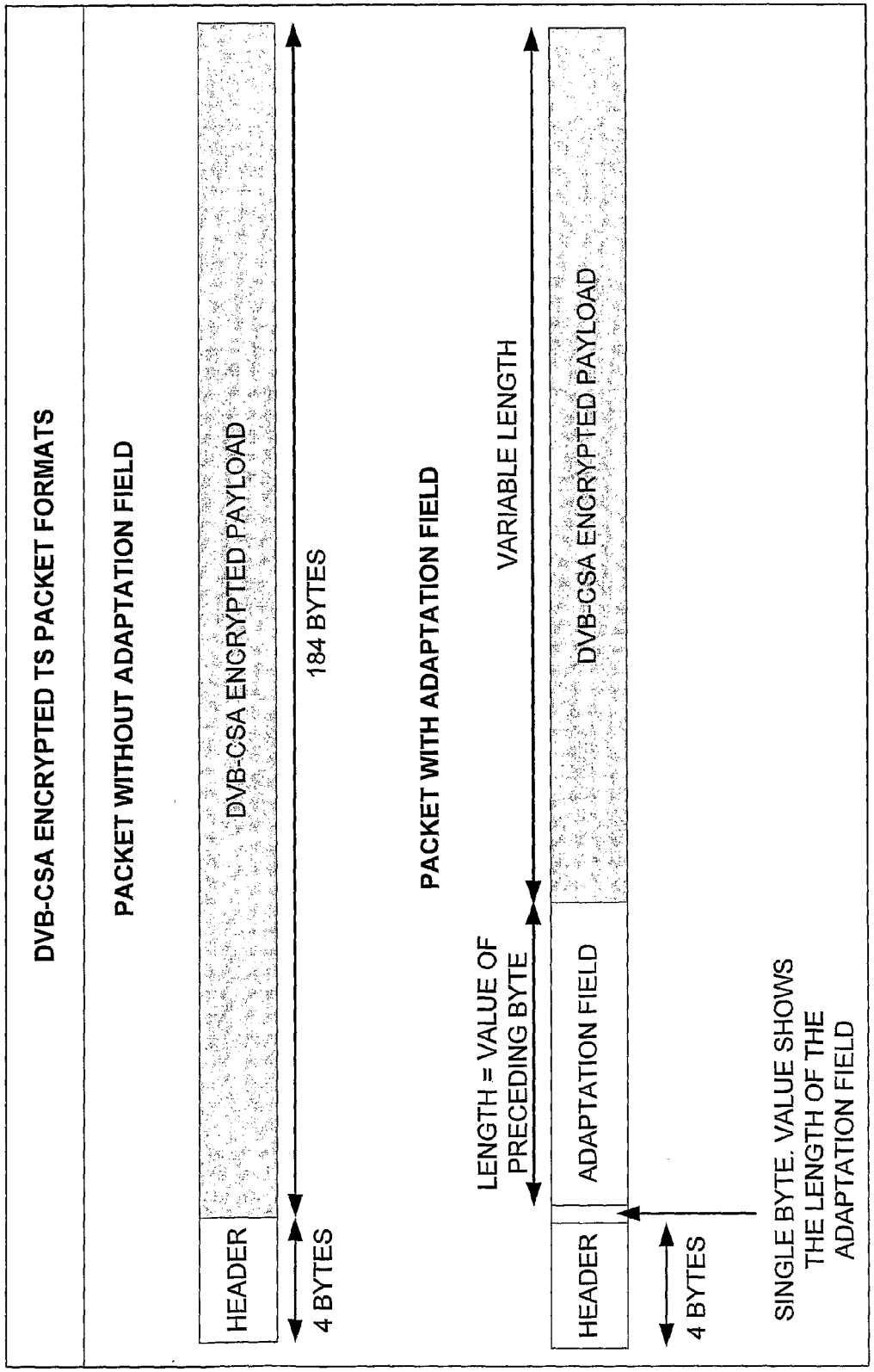
FIG. 5 is an illustration of the format of DVB-CSA scrambled transport stream packets according to embodiments of the present invention.

FIG. 5 shows the format of DVB-CSA scrambled TS packets. The encryption recommendations described above are preferably adhered to, so the various headers are not encrypted.

If the Adaptation Field Control bits indicate the packet contains an adaptation field, the adaptation field itself must also be left in the clear (see ISO/IEC 13818-1 section 2.4.3.3). The length of the adaptation field can be determined by examining the first byte after the end of the packet header, and then all bits after the end of the adaptation field are encrypted.

The recommended operation of a Secure Video Processor Native Scrambling Algorithm (SVP-NSA) scrambler will now be described.

SVP-NSA is a symmetric block cipher which operates on data in blocks 16 bytes (128 bits) in length, and utilises ciphertext stealing to operate on any residue data SVP-NSA is based on AES in CBC confidentiality mode and uses keys 128 bits (16 bytes) in length.

However many legacy CWGs and NDS smart cards only support 64-bit control words. In such legacy systems each 64-bit control word produced by a CWG/smart card must be expanded into a 128-bit NSA key. Also, as the transport packet payload length is not an exact multiple of 16 bytes, the residue data is handled in a specific way by NSA allowing the complete payload to be encrypted.

Encryptors are preferably configurable to support both true 128 bit and 64 bit "Control word expansion" modes of operation.

NSA is used in the MPEG-2 scheme. NSA is used in the MSC Data Independent (MDI) mode to perform encryption/decryption. This means that changes in the "Must Stay Clear" section of TS packet data (e.g. due to multiplexer actions such as PID/PCR changes) will not affect the encryption/decryption process.

For MDI operation, the initialization value (IV) is formed from the insertion of (TS) packet length (188 bytes) and MSC section length into a 16-byte value. Note that the MSC section length (=4 bytes in packet without adaptation field) will change when adaptation fields are encountered in the stream.

Figure 6:
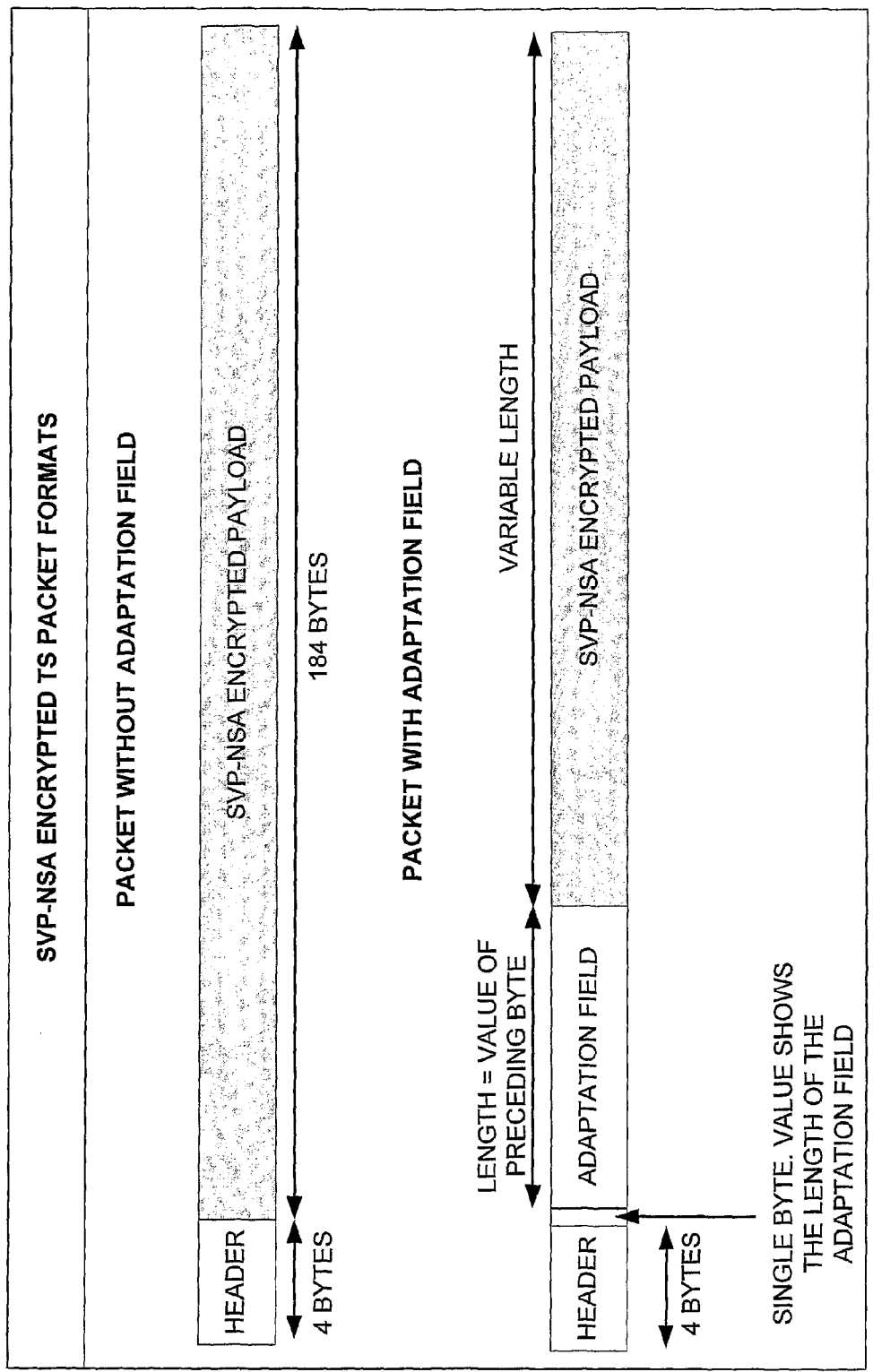
FIG. 6 is an illustration of the format of SVP-NSA scrambled transport stream packets according to embodiments of the present invention.

FIG. 6 shows the format of SVP-NSA scrambled TS packets. The encryption recommendations described above are preferably adhered to, so the various headers shall not be encrypted.

If the Adaptation Field Control bits indicate the packet contains an adaptation field, the adaptation field itself must also be left in the clear (see ISO/IEC 13818-1 section 2.4.3.3). The length of the adaptation field can be determined by examining the first byte after the end of the packet header, and then all bits after the end of the adaptation field shall be encrypted.

Further information regarding SVP-NSA may be found in the following patent applications, the disclosures of which are hereby incorporated herein by reference: PCT Patent Application No. PCT/IL03/001108 and corresponding U.S. patent application Ser. No. 10/545,737; PCT Patent Application No. PCT/IL04/000144 and corresponding U.S. patent application Ser. No. 10/541,002; PCT Patent Application No. PCT/IL05/000499; PCT Patent Application No. PCT/IL05/000957; and PCT Patent Application No. PCT/IL06/000367.

The insertion of CA related descriptors into the PMT will now be described in more detail.

RECM location (and in-band ECM location if in-band ECM mode is configured) along with other CAS information is signalled in the PMT using one or more CA Descriptors.

CA Descriptor(s) for each encrypted service are conveyed within the service descriptor loop of the associated PMT.

All encrypted elementary streams within a service's SPTS have the same crypto periods and CWs, which are also conveyed via the same set of ECMs.

If a broadband TV system has multiple stream encryption formats applied (depending on the CA/encryption schemes in use and the nature of the content) the service SPTS may contain RECMs (which in-turn point to Out-of-Band ECMs) and/or it may contain in-band ECMs. The PMT/CA Descriptor signals which scheme is in use with the associated content, by means of the CAS_ID value.

Where there is more than one set of ECMs for a given service (e.g. if in-band and OOB ECM mode is configured or during viewing card changeover) there will be multiple ECM streams associated with that content. For real-time multicast service streams, all applicable ECM streams are multicast alongside the service such that all receivers belonging to any of the CAS_ID groups can receive and decrypt the same service. However, OOB ECM streams always share a single RECM stream, to which the RECM's PMT/CA descriptor points. Multiple PMT/CA descriptors are generated where in-band ECMs are being used, in order to define RECM location and in-band location individually.

The PMT/CA Descriptor(s) conforms to the format of the MPEG-2 CA Descriptor, as defined below:

| Syntax | Field Size/Type | Value |
| --- | --- | --- |
| CA Descriptor (PMT) ( ) | | |
| Descriptor_Tag | 8-bits binary | 0x09 |
| Descriptor_Length | 8-bits binary | 0x06 |
| CAS_ID | 16-bits binary | 0x09FF for RECM stream System configurable for in-band ECM stream(s) |
| Reserved | 3-bits binary | "111" |
| CA_PID | 13-bits binary | System configurable, Default = 0x0500 for RECMs Default = 0x0501 for first in-band ECM stream |
| Private data ( ) | | |
| Reserved | 8-bits binary | Set to 0xFF |
| Encryption_Algorithm | 8-bits binary | 0x01 for AES-ECB 0x02 for DVB-CSA 0x03 for SVP-NSA (MDI) 0x05 for SVP-NSA (MDD) |

Descriptor Tag: Set to 0x09, as defined in ISO-IEC 13818-1

Descriptor Length: As defined in ISO-IEC 13818-1. For example, the CA Descriptor length field is set to 6.

CAS_ID: Where OOB ECMs are in use, this field contains a fixed value indicating that the descriptor is pointing to a RECM stream and not to a "traditional" in-band ECM stream. The RECM CAS_ID value is 0x09FF. This value is independent from any of the previously defined NDS CAS_IDs. The RECM CAS_ID value is assigned within the PMT/CA descriptor when the content is first encrypted and is not modified elsewhere within the system. The STB/verifier is able to distinguish the significance of the RECM CAS_ID value from any other CAS_ID value and thereby switch to OOB ECM operation. If in-band ECMs are in use then additional CA descriptors are generated, and this field identifies the CA System responsible for encrypting the service. This value is a copy of the most significant 16-bits of the SuperCAS_ID.

CA_PID: This points to the PID within a service SPTS that contains the RECM stream. For an in-band ECM stream, the additional CA descriptor specifies the PID of the in-band ECMs. This value defaults to 0x0500 for the RECM stream, and 0x0501 for the first in-band ECM stream (if IB mode is configured) within the SPTS. For additional in-band ECM streams, the default CA_PID value is in the range 0x0502-0x0504. It should be noted that there are never multiple RECM streams. The CA_PID assignments are system configurable to other values.

Encryption_Algorithm: Indicates the cryptographic algorithm that has been applied to the service stream. For example, AES-ECB, DVB-CSA and SVP-NSA (in MDI and MDD modes).

The location of OOB ECMs is not signalled within the PMT/CA descriptor. They are instead expected to be signalled via the IPTV EPG system. This involves delivering the OOB ECM multicast IP address and port number to the STB within the HTTP/HTML EPG pages, or equivalent mechanisms.

The DVB Scrambling Descriptor is defined in ETSI TS 103 197 section 6.2.30 and provides a standardised mechanism to signal the scrambling algorithm in use. It is used in addition to the Encryption_Algorithm signalling in the CA_descriptor private data to ensure backward compatibility with existing systems.

The scrambling descriptor is carried in the program loop of the PMT with the following format:

| Syntax | Field Size/Type | Value |
| --- | --- | --- |
| Scrambling Descriptor (PMT) ( ) | | |
| Descriptor_Tag | 8-bits binary | 0x65 |
| Descriptor_Length | 8-bits binary | 0x01 |
| Scrambling_Mode | 8-bits binary | DVB defined: 0x01 for DVB-CSAv1 0x02 for DVB-CSAv2 0x81 for AES-ECB 0x83 for SVP-NSA (MDI) 0x85 for SVP-NSA (MDD) |

Descriptor Tag: Set to 0x65.

Descriptor Length: Number of bytes in the descriptor following this length field.

Scrambling_Mode: The value defining the scrambling algorithm in use. For example, DVB-CSA (in v1 and v2 modes), AES-ECB and SVP-NSA (in MDI and MDD modes). The value range 0x01-0x7F is DVB defined and the values 0x00 and 0xFF are DVB reserved.

The scrambling mode defined here matches that defined in the Encryption_Algorithm field of the CA Descriptor. The STB/Verifier may use either descriptor's field to identify the decryption algorithm to apply to an encrypted stream, but use of this descriptor is preferred.

Figure 7:
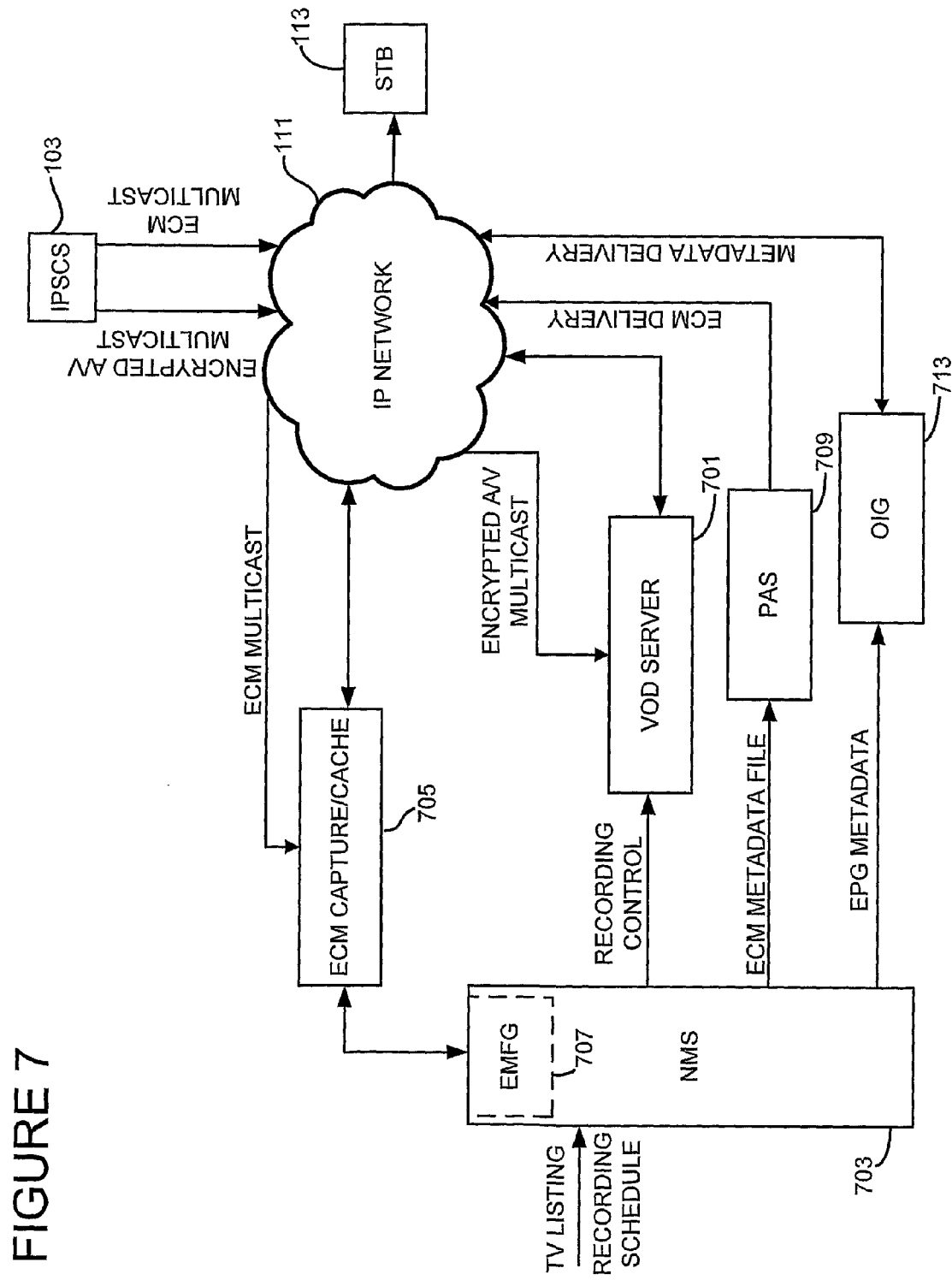
FIG. 7 is a simplified pictorial illustration of the headend of the broadband TV system of FIG. 1.

Referring once again to FIG. 1, it will be remembered that IPSCS 103 multicasts encrypted A/V data (together with RECMs) to STB 113 via IP network 111 and that IPSCS also delivers OOB ECMs (together with RECMs) to STB 113 also via IP network 111 but on a different multicast to that on which it delivers the encrypted A/V content. The scrambled A/V multicast and the OOB ECM multicast are also used by various other headend components and these components will now be described in relation to FIG. 7.

The encrypted A/V multicast delivered into IP network 111 by IPSCS 103 is received by VOD server 701. VOD server 701 records broadcast TV channels (or a windowed portion thereof) to support Pause Live TV functionality that will be described in more detail below. VOD server 701 also records discrete broadcast events to support Archive TV functionality that will also be described in more detail below. The scheduling of which events VOD server 701 records is typically controlled by Network Management System (NMS) 703, which interfaces with VOD server 701. There may not be a direct link between VOD server 701 and NMS 703. Rather, the interface could be provided by an interface into a VOD manager (not shown), which controls all distributed VOD servers.

The ECM multicast delivered into IP network 111 by IPSCS 103 is received by ECM capture and cache 705. ECM capture and cache 705 monitors the ECM multicast, captures ECMS and associated RECMs, and caches them along with an ECM timestamp (ETS) indicating the time at which the ECM was captured. The time at which the ECM was captured defines the start of the crypto period to which the ECM applies. The ECM, RECM and ETS are then made available to STB 113 to support Rewind Live TV and View Recording functionality that will both be described in more detail below. ECM capture and cache 705 interfaces with NMS 703, which allows for the creation of an ECM windowed cache session (i.e. caching of ECMs for a specified period of time (e.g. 2 hours). These cached ECMs can be used to decrypt a windowed portion of broadcast TV that is being recorded by VOD server 701. As the ECMs become older than the specified time, they are dropped from the cache).

ECM capture and cache 705 may personalise ECMs before sending them to a STB (for example, using the ID of the viewing card associated with the SRB).

The ECM, RECM and ETS can also be used to generate an ECM metadata file at the time an event is recorded by VOD server 701. The ECM metadata file is then used to support Archive TV functionality. The ECM metadata file contains all the ECMs for a given piece of A/V content.

An ECM metadata file maps an ECM to its corresponding RECM, an ETS, and the ECM's crypto period parity as shown in the table below.

| ECM_ID | ECM data | ETS | Parity |
|---|---|---|---|
| 1 | 0x123456 | 0 | odd |
| 2 | 0x6274384 | 101 | even |
| 3 | 0x3857833 | 444 | odd |
| 4 | 0x9983A3 | 655 | even |

The ECM_ID is the ECM_Reference_Value( ), i.e. the globally unique identifier assigned to each RECM/OOB ECM.

ECM data is the actual OOB ECM datagram that controls the scrambling of the A/V content.

Figure 18:
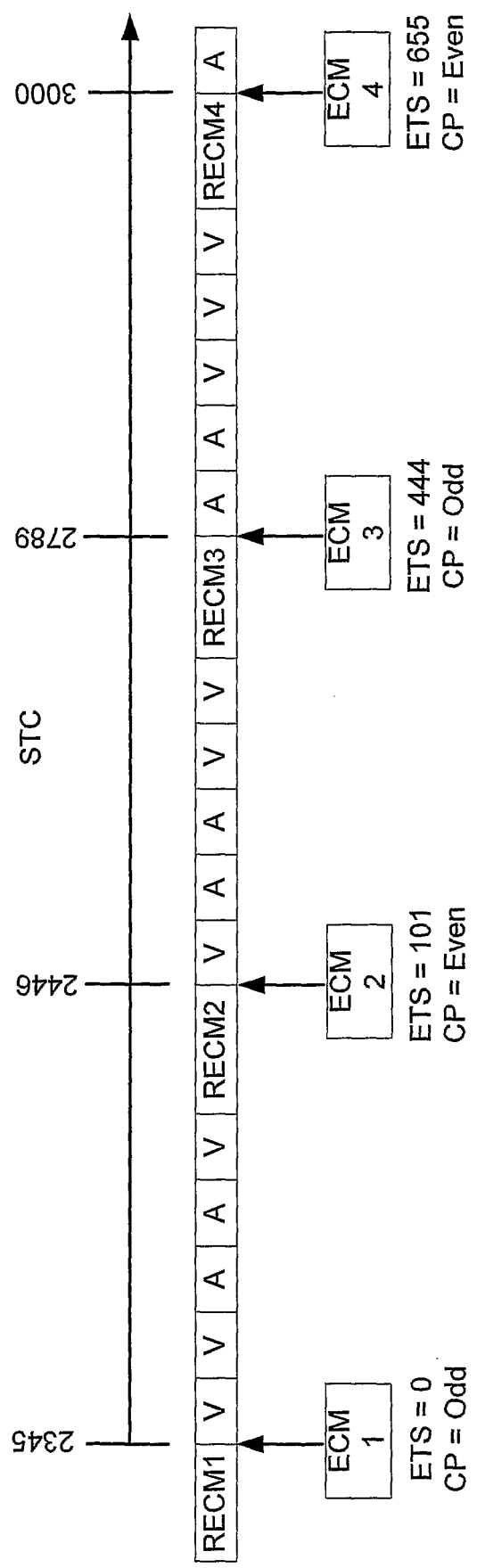
FIG. 18 is an illustration of a transport stream according to embodiments of the present invention.

The ETS is defined using the system time clock (STC) relative to the start of the content. Referring to FIG. 18, an example transport stream is shown that contains audio packets (A), video packets (V) and RECM packets. The transport stream is shown lasting from STC 2345 to STC 3000. ECM1 is valid for the off crypto period at the start of the content, is referenced by RECM1 and has an ETS of 0. ECM2 is valid for the subsequent even crypto period, is referenced by RECM2 and has an ETS of 101 (i.e. STC 2446-STC 2345). ECM3 is valid for the next off crypto period, is referenced by RECM3 and has an ETS of 444 (i.e. STC 2789-STC 2345). ECM4 is valid for the next even crypto period, is referenced by RECM4 and has an ETS of 655 (i.e. STC 3000-STC 2345).

The ECM metadata file is generated by an ECM metadata file generator (EMFG) 707, which is part of NMS 703, and distributed to PAS 709. PAS 709 interfaces with NMS 703 and is used to support Archive TV functionality.

ECM capture and cache 705 and VOD server 701 are synchronised to a single clock to ensure that the ETS logged by the ECM capture process when a crypto period change is detected may be used to pre-load the correct control word when the STB instructs VOD server 701 to jump to a particular point in a piece of recorded content. Synchronisation is preferably achieved using the Network Time Protocol (NTP).

NMS also interfaces with OnDemand Information Generator (OIG) 713, which provides metadata describing A/V content to STB 113. In the case of Archive TV, OIG 715 provides access to the Content Descriptions and information about when content was originally broadcast. In addition, OIG 715 may also provide one or more future ECMs (ECMs) (private data used to authorize the reservation of future events) which define the access rights that a user must have to be able to consume the content. OIG 715 may also allow STB 113 to determine if a Service has Pause Live TV functionality available and what the maximum pause period is. Alternatively this information may be available within the broadcast metadata (SI) feed.

Figure 8:
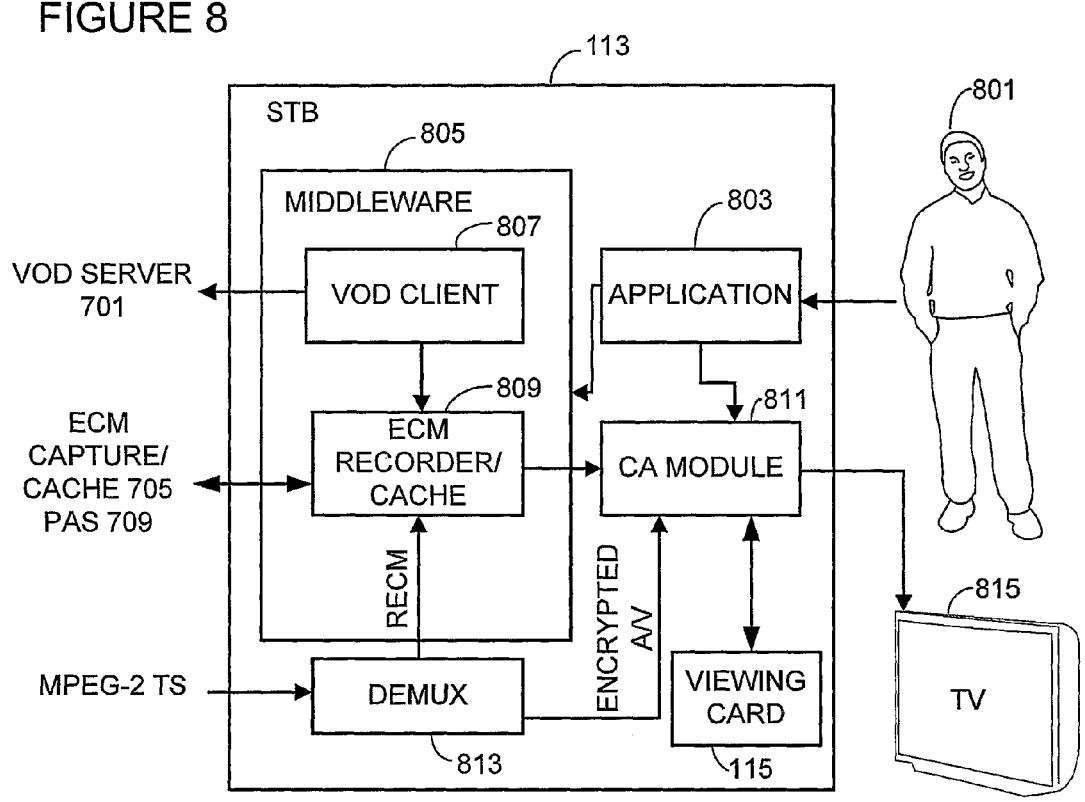
FIG. 8 simplified pictorial illustration of the STB of the broadband TV system of FIG. 1.

STB 113 will now be described in more detail with reference to FIG. 8. A user 801 interfaces with STB 113 via an application 803. Application 803 interfaces with middleware 805, which includes VOD client 807 and ECM recorder 809. Application 803 also interfaces with CA module 811.

Application 803 is responsible for configuring ECM recorder 809, VOD client 807 and CA module 811 to enable the acquisition of ECMs, to control VOD server 701, to enable user 801 to switch channels etc.

VOD client 807 establishes and manages communication with VOD server 701 in the headend, for the delivery of a unicast MPEG-2 TS when user 801 requests any of the following functionalities via application 803: Pause Live TV, Archive TV, Rewind Live TV, View Recording. Preferably, VOD client 807 controls the streaming of the A/V content using a number of Real Time Streaming Protocol (RTSP) calls. It should be noted that the initial RTSP setup call is typically sent to a VOD Session Manager (not shown), which allocates resources on VOD server 701. Once a VOD session has been established, VOD client 807 then communicates directly with VOD server 701.

ECM recorder 809 acquires and manages ECMs. ECMs are acquired from one or more of the following sources:

PAS 709—in the form of ECM metadata files (in case of Archive TV);

ECM multicast stream;

ECM capture and cache 705.

The acquired ECMs are stored in RAM (not shown) in STB 113 and are requested by CA module 811 when required.

CA module 811 (together with viewing card 115) manages the descrambling/decryption and access to A/V content. It acquires ECMs from ECM recorder 809 when appropriate for each new crypto period detected within the A/V content being consumed.

Encrypted A/V content is received by STB 113 from one of the following sources:

VOD server 701;

Encrypted A/V multicast stream.

An example will now be described where a user 801 is able to view live broadcast A/V content. The following functionalities are also available to user 801 and will be described in more detail below: Pause Live TV, Rewind Live TV, View Recording.

Figure 9:
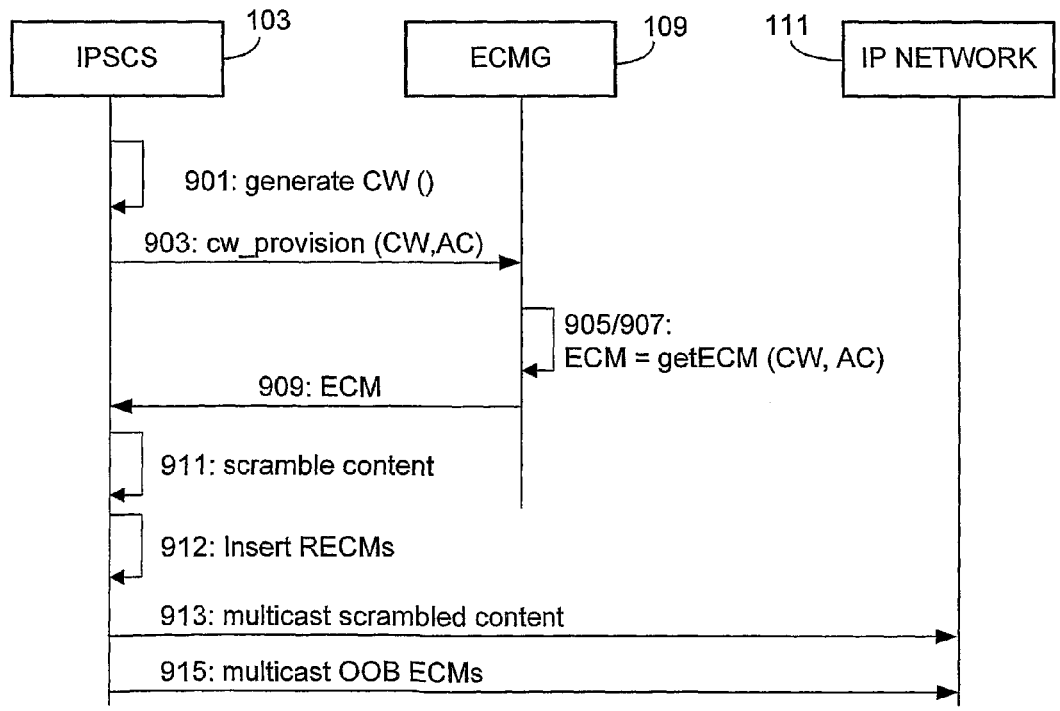
FIG. 9 is a message flow diagram showing a method for generating of nPVR ECMs according to embodiments of the present invention.

Referring to FIG. 9, in step 901, CWG 107 in IPSCS 103 generates control words for each new crypto period (as described above) and passes these CWs to ECMG 109 (step 903) together with some access criteria, as described above. ECMG 109 generates ECMs (step 905) and returns the ECMs to IPSCS 103 (step 909), which uses them to scramble some A/V content (step 911), as described above. IPSCS 103 then generates RECMs for the A/V content and inserts the RECMs into the A/V SPTS (step 912). IPSCS 103 then multicasts the scrambled A/V content together with any optional in-band, broadcast ECMs and the RECMs (step 913). IPSCS 103 also multicasts the OOB ECMs (step 915) but on a different multicast to that used for the scrambled A/V content in step 913.

Figure 10:
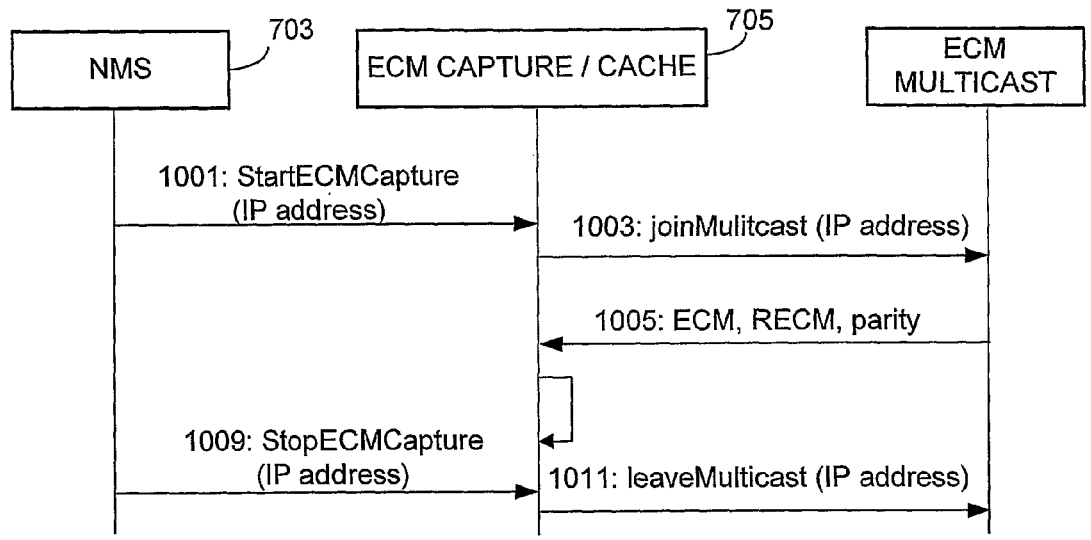
FIG. 10 is a message flow diagram showing a method for capturing nPVR ECMs in a network, according to embodiments of the present invention.

In order to support the Rewind Live TV and View Recording functionalities, ECM capture and cache 705 captures OOB ECMS off the ECM multicast Referring to FIG. 10, NMS 703 instructs ECM capture and cache 705 to start capturing ECMs (step 1001). ECM capture and cache 705 then joins the OOB ECM multicast (step 1003) and starts receiving OOB ECMs (step 1005) and caching them. On receiving the OOB ECMs, ECM capture and cache 705 logs the time that the OOB ECM became available (i.e. logs the approximate time at which the crypto period started) (step 1007). NMS 703 can instruct ECM capture and cache 705 to stop capturing OOB ECMs (step 1009) in which case ECM capture and cache 705 leaves the OOB ECM multicast (step 1011).

Figure 11:
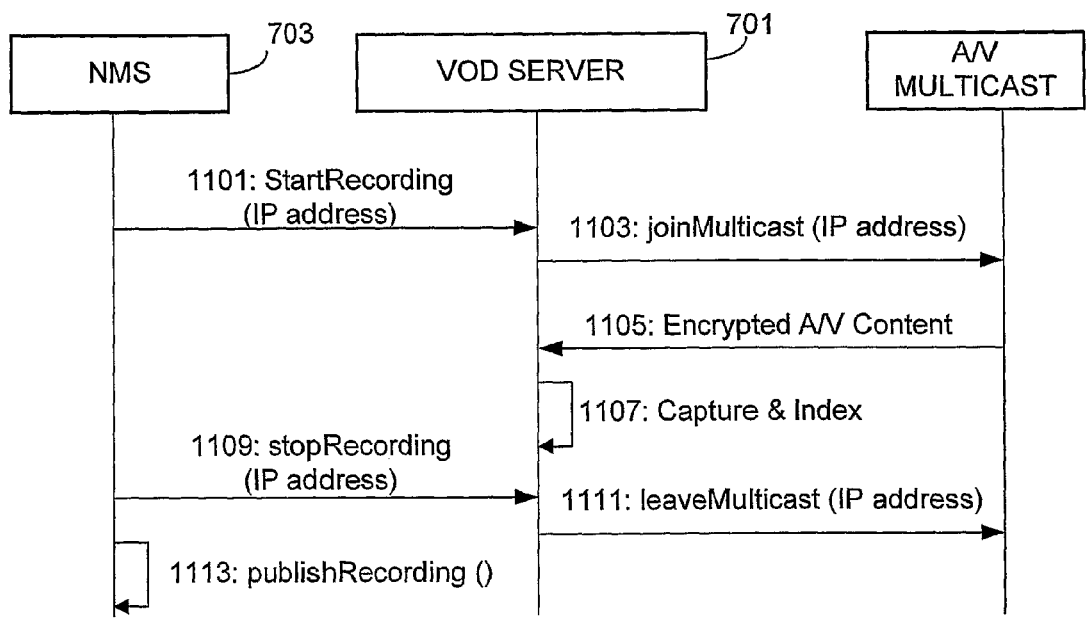
FIG. 11 is a message flow diagram showing a method for capturing video content in network, according to embodiments of the present invention.

In order to support the Rewind Live TV, Pause Live TV and View Recording functionalities, VOD server 701 captures A/V content from the scrambled A/V content multicast Referring to FIG. 11, NMS 703 instructs VOD server 701 to start recording A/V content (step 1101). VOD server 701 then joins the encrypted A/V multicast (step 1103) and starts receiving encrypted A/V content (step 1105). VOD server 701 then captures the A/V content and preferably indexes it in real time (step 1107). VOD servers capable of generating index files of recorded A/V content in real time are available from C-COR Incorporated; Alcatel-Lucent; Entone Technologies, Inc.; or Motorola Connected Home Solutions. These index files are used to provide random access to the A/V content and support for trick modes. NMS 703 can instruct VOD server 701 to stop recording (step 1109) in which case VOD server leaves the encrypted A/V multicast (step 1111). Finally, NMS 703 may also publish details of the recording (step 1113).

Referring now to FIG. 12, when a user 801 tunes to a particular channel to view some A/V content (step 1201) (either by turning on TV 815 for the first time or changing channels), middleware 805 configures STB 113 to join the relevant ECM multicast (step 1203) which results in ECM recorder 809 starting to receive information from the ECM multicast (step 1205) to enable the descrambling of the captured A/V content. It will be remembered from the above description that this information includes, for each crypto period:

ECM—which, it will be remembered, allows access to the CW needed to decrypt the A/V content (provided user 801 has the appropriate access rights);

RECM—which, it will be remembered, is a unique value used to identify the crypto period in which the ECM is valid. A matching value is carried as an RECM within the encrypted A/V multicast; and Parity—which, it will be remembered, is the parity of the crypto period.

ECM recorder adds an ECM timestamp (ETS) to the received information (i.e. the time at which the ECM becomes available in the ECM multicast which is the approximate time at which the crypto period started) and caches the ECM, RECM, parity and ETS (step 1207). Preferably, a circular RAM buffer is used as the cache and thus the oldest, existing entries in the buffer are overwritten when the buffer wraps (i.e. when the buffer becomes full).

Middleware 805 then configures STB 113 to join the relevant encrypted A/V multicast (step 1209) which results in CA module 811 receiving encrypted A/V content (step 1211). CA module 811 then uses the RECMs received in the encrypted A/V multicast to fetch the correct ECMs from ECM recorder 809 (step 1213) and uses the ECMs to generate a CW and descramble the received encrypted A/V content using the generated CW (step 1215).

The Pause Live TV functionality mentioned previously will now be described in more detail with reference to FIGS. 13a and 13b. This functionality enables user 801 to pause live TV and then resume watching from the point at which it was paused.

Figure 13A:
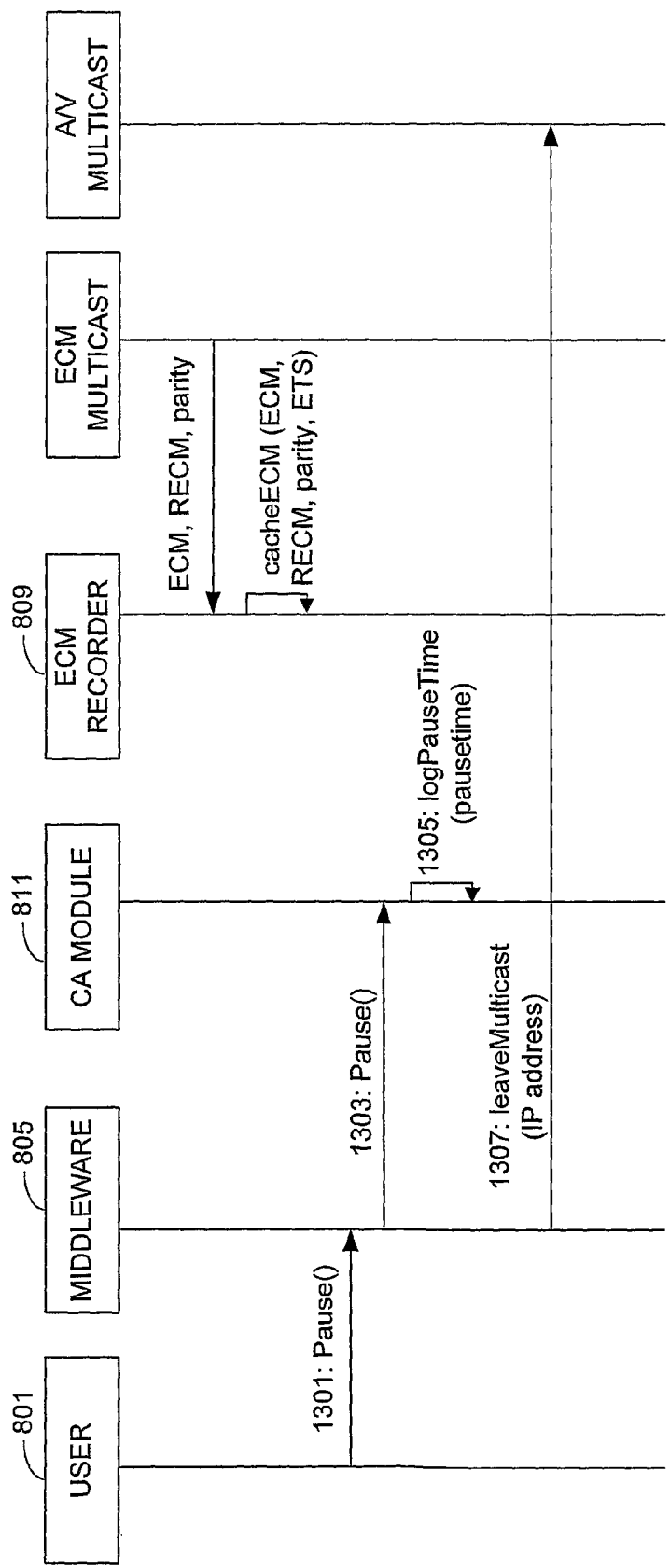
FIG. 13*a* is a message flow diagram showing a method for pausing live scrambled video content, according to embodiments of the present invention.

Referring first to FIG. 13a, it is assumed that ECM recorder 809 is already capturing and caching ECMs as described above in relation to FIG. 12 (and more specifically steps 1205 and 1207, which are duplicated on FIG. 13a but not numbered). When user 801 selects pause (step 1301), middleware 805 instructs CA module 811 to pause descrambling of A/V content (step 1303) and at this time, CA module 811 logs the time at which the pause request was received from user 801 (step 1305). Middleware 805 then leaves the encrypted A/V multicast (step 1307). The ECMs from ECM multicast continue to be captured and cached by ECM recorder 809 whilst in pause mode. Preferably a maximum pause window is defined, which is the maximum length of time that an event can be paused for. When the maximum pause period is reached, ECMs will still continue to be captured however it is only possible for user 801 to view the paused stream from the resume time minus the maximum pause window. It should be noted that the circular RAM buffer used to cache the ECMs is sufficiently large to store all ECMs delivered during the maximum pause period.

Figure 13B:
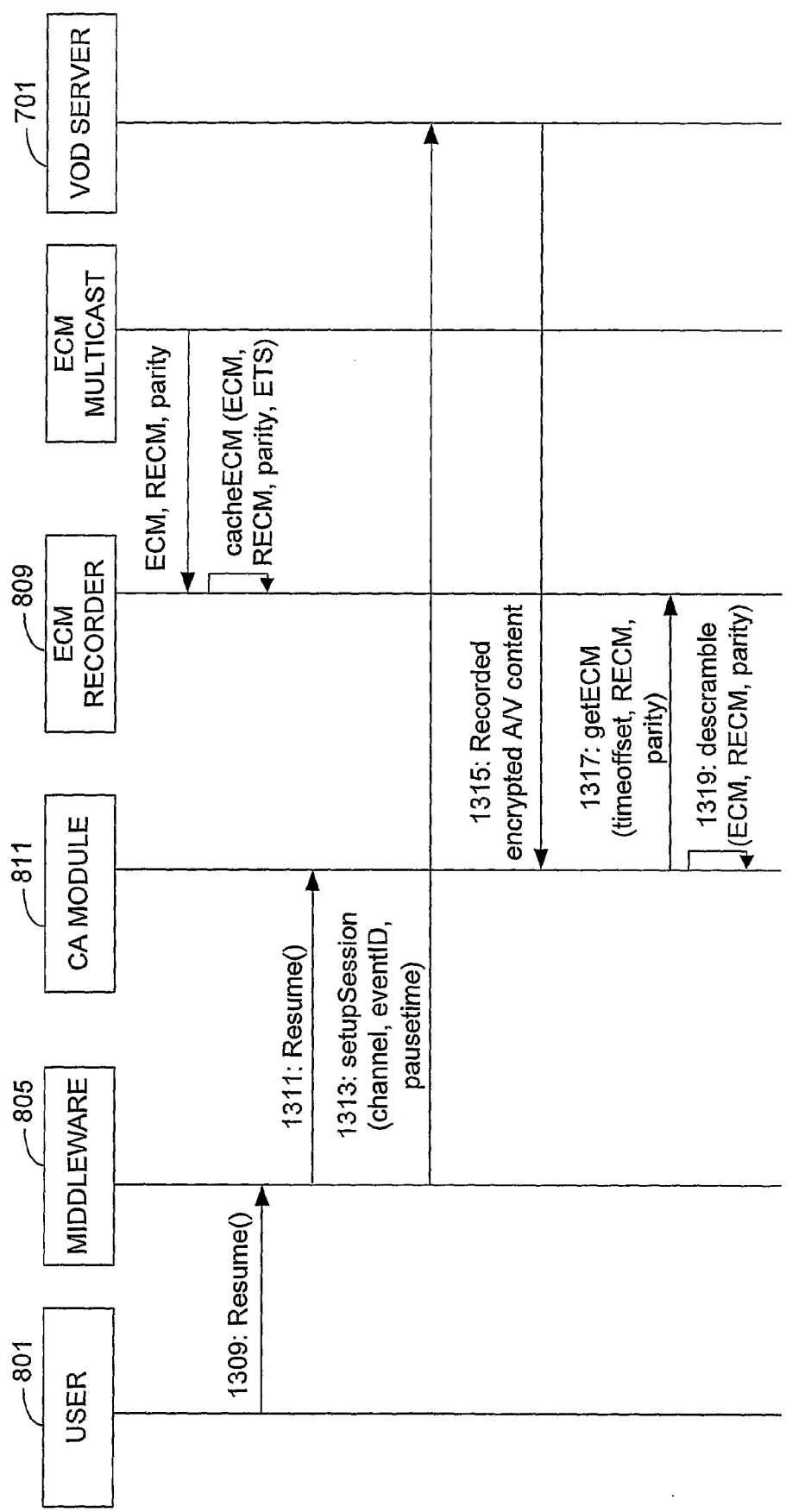
FIG. 13*b* is a message flow diagram showing a method for resuming the receiving and descrambling of scrambled video content after it had been paused, according to embodiments of the present invention.

Referring now to FIG. 13b, it will be remembered that during pause mode, ECM recorder 809 continues to capture and cache ECMs (shown in FIG. 13b but not numbered). When user 801 selects to resume viewing (step 1309), ECM recorder 809 still continues to capture and cache ECMs. Also, middleware 805 instructs CA module to prepare itself to resume descrambling of A/V content (step 1311). Middleware 805 sends a VOD session setup request to VOD server 701 requesting a VOD session starting from the pause time logged by CA module 811 in step 1305. VOD server then starts streaming the requested, recorded, encrypted A/V content (step 1315). CA module 811 then calculates a time offset (i.e. the current time minus the pause time) and uses the time offset and the RECMs received with the encrypted A/V content returned by VOD server 701 to fetch the ECMs (step 1317) required to descramble the content (step 1319). As was noted above, it may not be possible to resume form the pause point due to the fact that the pause period exceeded a predetermined maximum pause window. In such a case, it is only possible to resume from the current time minus the maximum pause window.

The Rewind TV functionality mentioned previously will now be described in more detail with reference to FIG. 14. This functionality allows user 801 who has just tuned to a new channel to view what has been broadcast on the selected channel before user 801 tuned to the channel.

Figure 14:
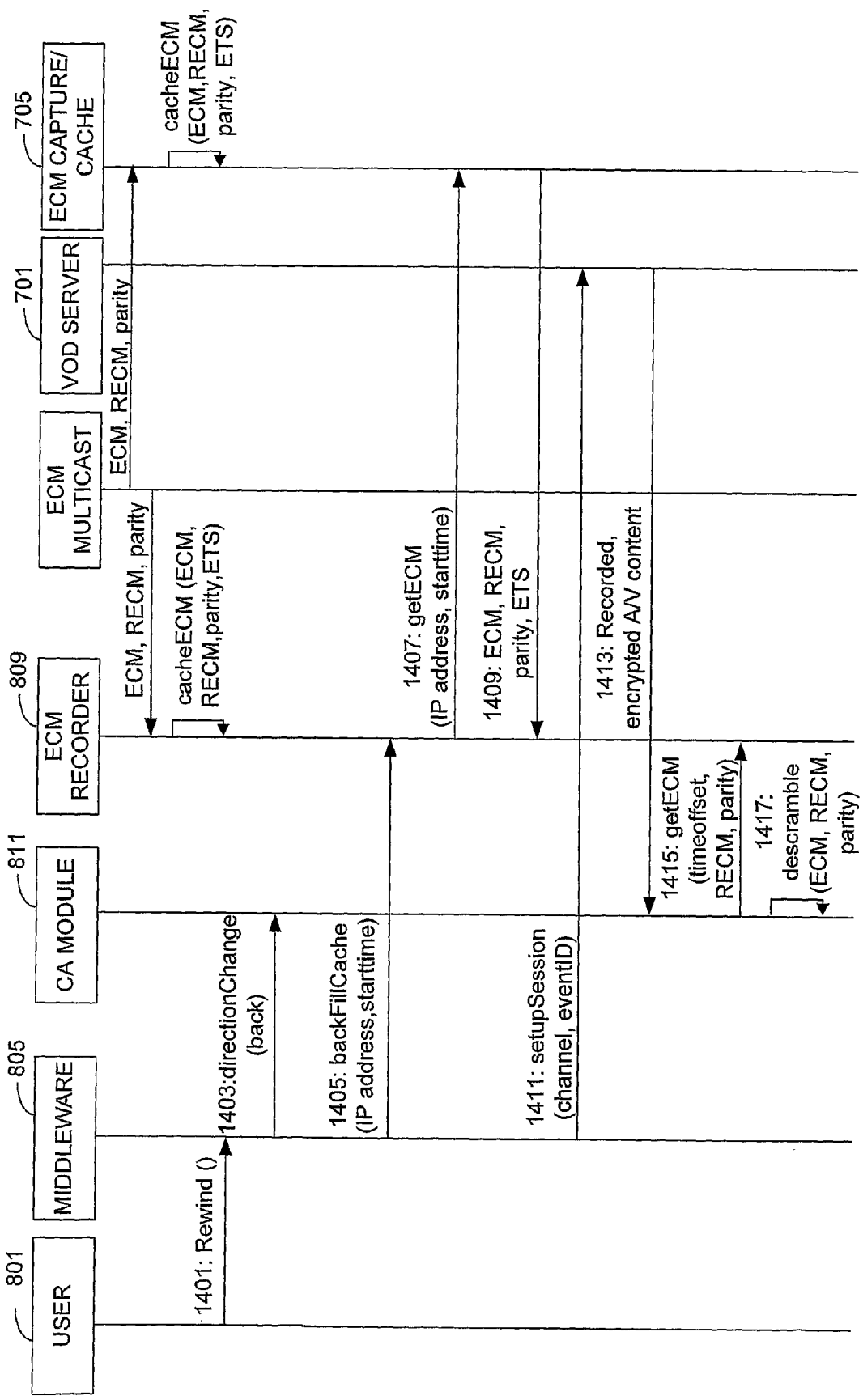
FIG. 14 is a message flow diagram showing a method for rewinding live scrambled video content, according to embodiments of the present invention.

It is assumed that ECM capture and cache 705 is capturing ECMs from the ECM multicast as described above in relation to FIG. 10 (and more specifically steps 1005 and 1007, which are duplicated on FIG. 14 but not numbered). It is further assumed that from the time user 801 tunes to a new channel, ECM recorder 809 captures and caches ECMs as described above in relation to FIG. 12 (and more specifically steps 1205 and 1207, which are duplicated on FIG. 14 but not numbered).

When user 801 selects to rewind live TV (step 1401) and wants to rewind past the point at which user 801 tuned to the channel, middleware 805 instructs CA module 811 to change direction (step 1403). ECM recorder 809 will only have cached ECMs from the time at which user 801 tuned to the channel and therefore middleware 805 also instructs ECM recorder 809 to fetch the ECMs for the time before user 801 tuned to the channel (step 1405). ECM recorder 809 then requests the ECMs it needs from ECM capture and cache 705 (step 1407). ECM capture and cache 705 returns the ECMs (together with RECMs, parity information and ETSs) to ECM recorder 809 (step 1409). Middleware 805 also sends a VOD session setup request to VOD server 701 (step 1411) requesting a VOD session starting from the previous point in time where user 801 wishes to view the channel. VOD server then returns the requested, recorded, encrypted A/V content (step 1413). CA module 811 then calculates a time offset (i.e. the current time minus the previous point in time where user 801 wishes to view the channel) and uses the time offset and the RECMs received with the encrypted A/V content returned by VOD server 701 to fetch the ECMs (step 1415) required to descramble the content (step 1417). In summary, when user 801 tunes to a new channel, ECM recorder 809 begins to cache ECMs it receives from ECM multicast. When user 801 wants to rewind past the point at which he tuned to the new channel, ECM recorder 809 continues to cache ECMs from the ECM multicast but also makes a call to ECM capture and cache 705 in the headend in order to fetch the ECMs for the time before user 801 tuned to the new channel.

A special case of the Rewind Live TV functionality is when user 801 tunes to an event that is still being transmitted but would like to see the event from the very beginning (also known as Restart TV). This is akin to recording the event but without having to previously schedule the recording. In this case, when user 801 sees an event that is still be transmitted but would like to see it from the beginning, the user selects the event and requests to view it. This causes middleware 805 to instruct ECM recorder 809 to start recording ECMs from the ECM multicast stream. It also causes middleware 805 to initialise itself with all past ECMs for the selected event by fetching these past ECMs from ECM capture and cache 705 in the headend. In this way, it is possible for user 801 to view the content from the beginning of the selected event.

The View Recording functionality mentioned previously will now be described in more detail with reference to FIGS. 15a and 15b. This functionality allows user 801 to request broadcast events to be recorded. The A/V content which forms the event to be recorded is recorded by VOD server 701 in the headend. This functionality also allows user 801 to begin playback of the recording before the recording has finished.

Figure 15A:
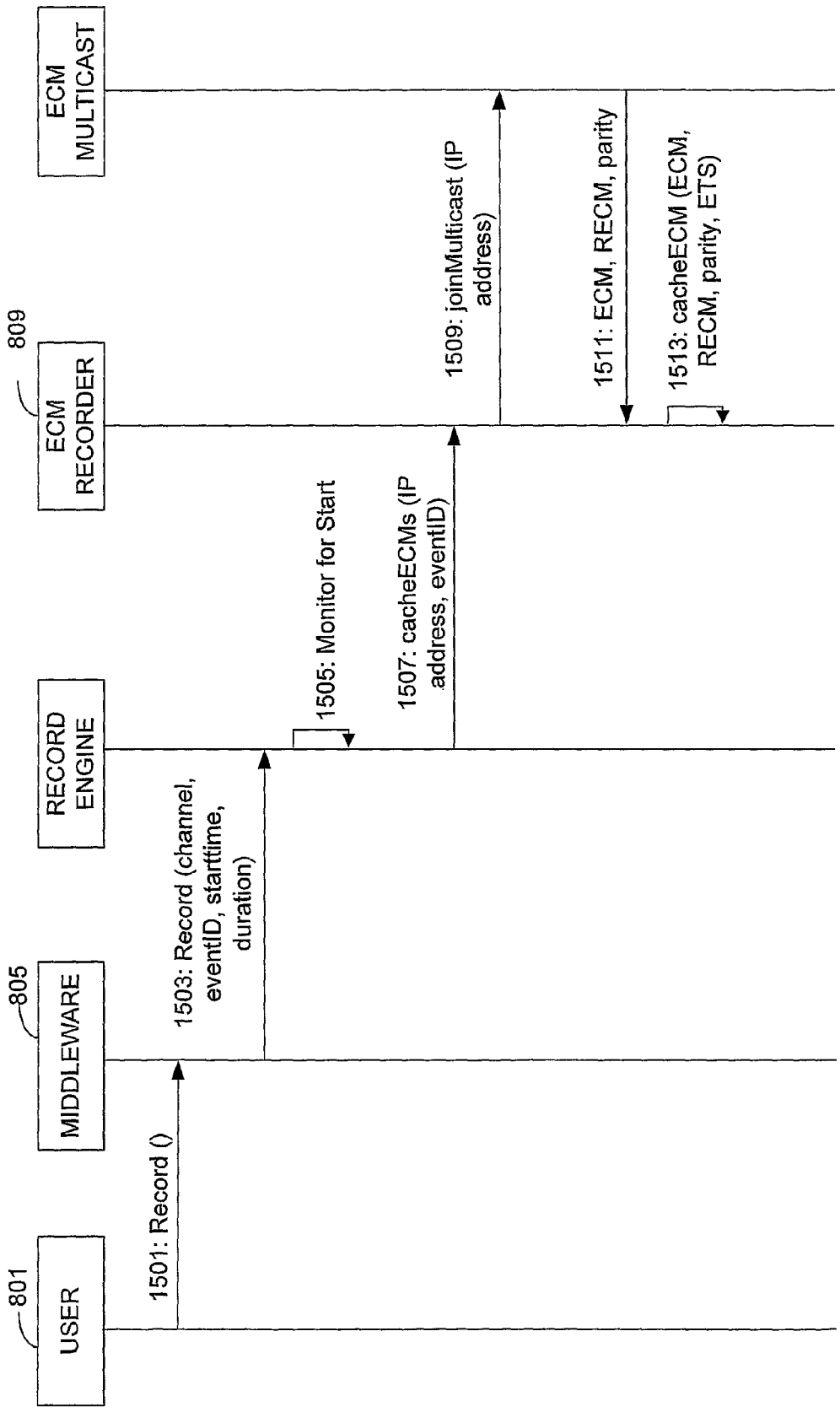
FIG. 15*a* is a message flow diagram showing a method for recording scrambled video content in a network, according to embodiments of the present invention.

Referring first to FIG. 15a, when user 801 decides to record an event (step 1501), middleware 805 sends a record instruction to a record engine in STB 113 (not shown) including details of the event such as channel, eventide, start time and duration (step 1503). The record engine then monitors for the start of the event (step 1505) and at the start of the event, record engine sends an instruction to ECM recorder 809 telling it to start capturing and caching ECMs (step 1507). ECM recorder 809 then joins the ECM multicast (step 1509) and starts receiving information from the ECM multicast (step 1511), as described above in relation to FIG. 12, step 1205. ECM recorder 809 then caches the information received from ECM multicast (step 1513), as described above in relation to FIG. 12, step 1207. It is to be noted that the event content itself is not recorded by STB 113. Rather, only the relevant ECMs are recorded. As mentioned previously, the A/V content which forms the event to be recorded is recorded by VOD server 701 in the headend.

Figure 15B:
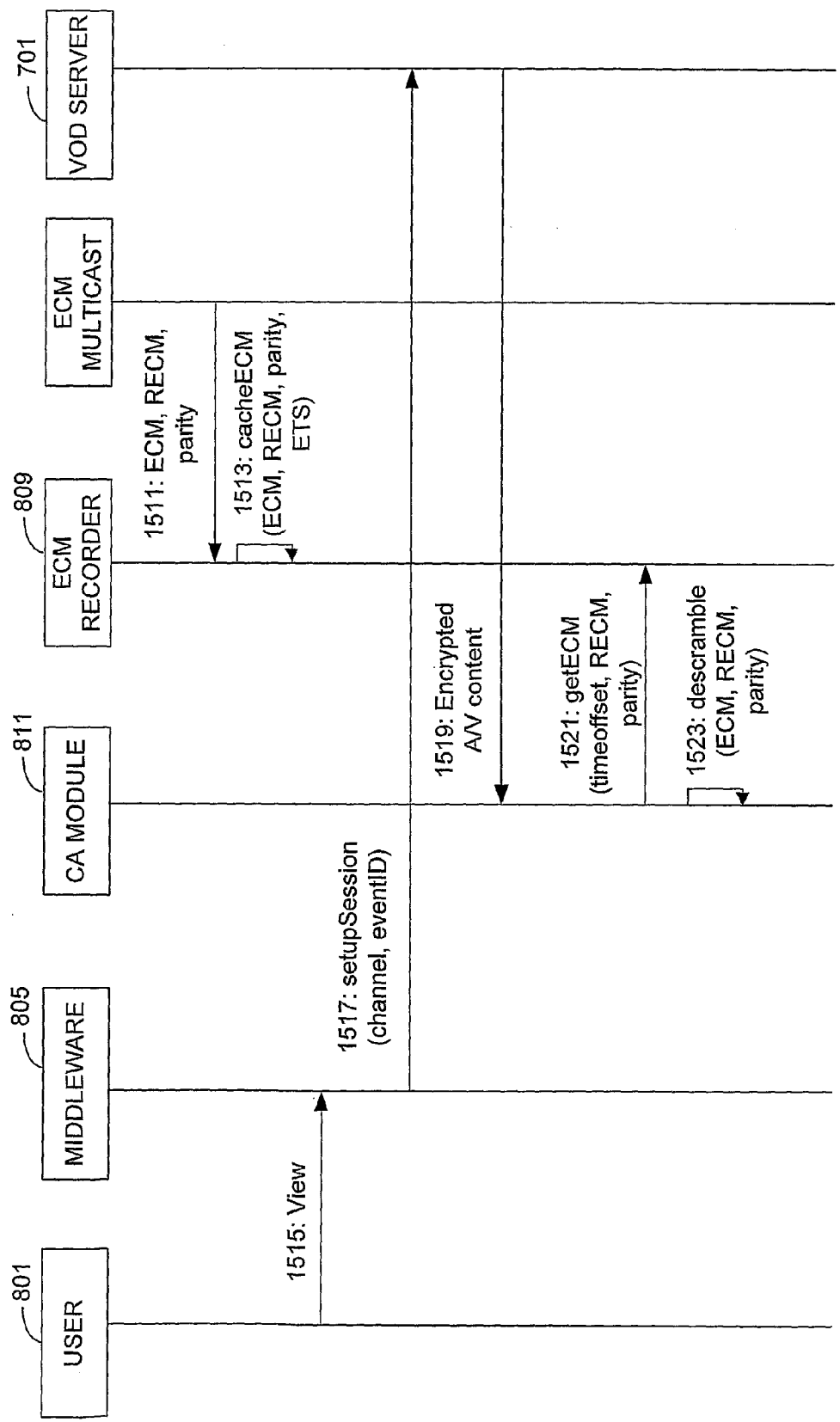
FIG. 15*b* is a message flow diagram showing a method for viewing scrambled video content that has been recorded in a network, according to embodiments of the present invention.

Referring now to FIG. 15b, user 801 requests to view an event (step 1515). Middleware 805 sends a VOD session setup request to VOD server 701 (step 1517) requesting a VOD session starting from beginning of the event being recorded. VOD server then returns the requested, recorded, encrypted A/V content (step 1519). CA module 811 then calculates a time offset (i.e. the current time minus the start time of the event) and uses the time offset and the RECMs received with the encrypted A/V content returned by VOD server 701 to fetch the ECMs (step 1521) required to descramble the content (step 1523). If user 801 has requested to view the event whilst it is still being recorded, ECM recorder 809 continues to capture and cache information from ECM multicast until the event end time is reached. The captured and caches ECMs can be deleted when user 801 no longer wishes to have access to the recorded event. Preferably, the captured and cached ECMs are deleted after a predetermined time, even if this is sooner than when user 801 no longer wishes to have access to the recorded event.

A further example will now be described where a user 801 is able to view archived A/V content. Archived A/V content comprises broadcast events that have been automatically recorded by the service provider.

It will be remembered from above that the ECM, RECM and ETS captured by ECM capture and cache 705 can be used to generate an ECM metadata file (EMF) at the time an event is recorded by VOD server 701. This EMF is used to support Archive TV functionality. The EMF contains all the ECMs for a given piece of A/V content.

Figure 16:
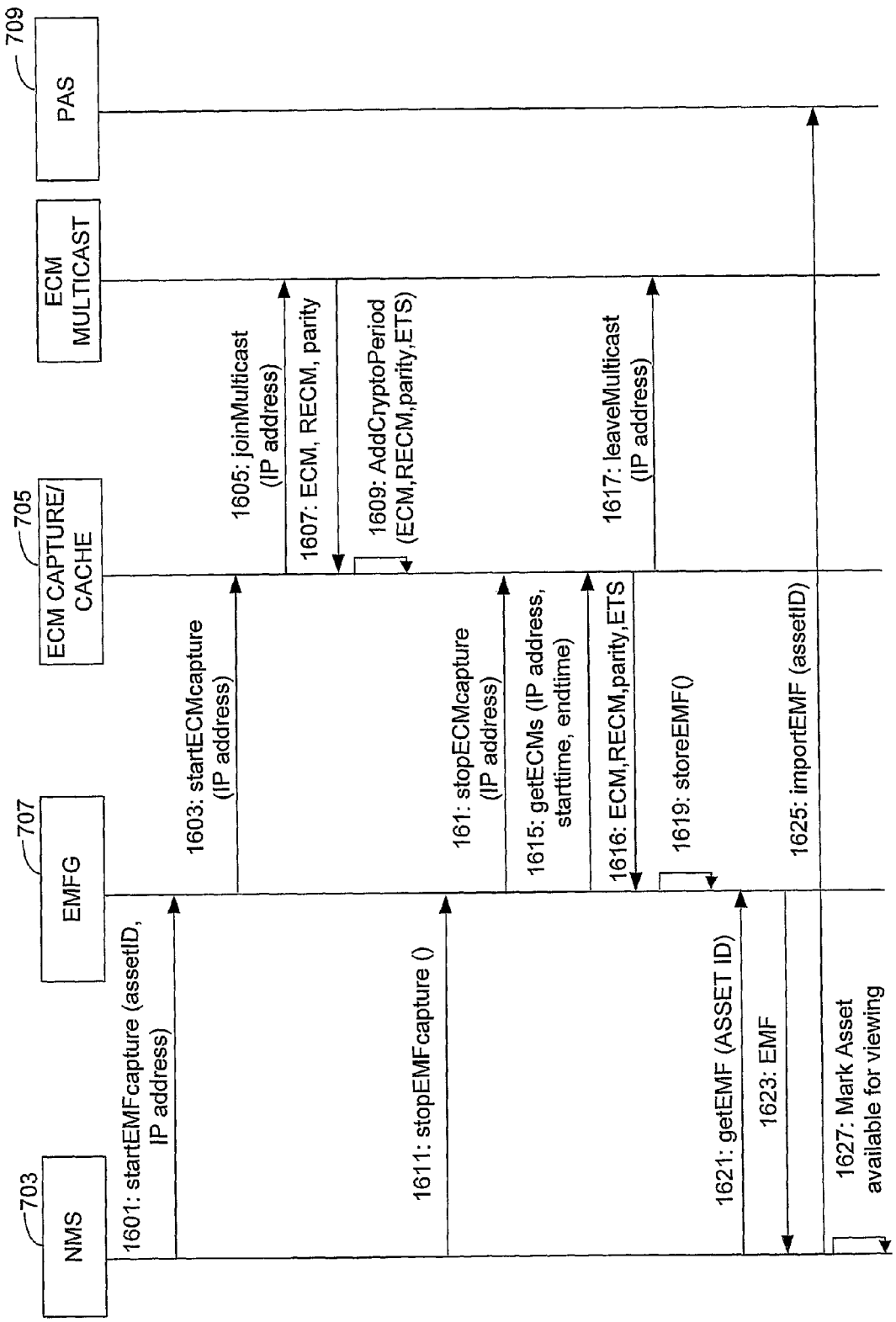
FIG. 16 is a message flow diagram showing a method for recording scrambled video content in a network for archive viewing by a user, according to embodiments of the present invention.

Referring to FIG. 16, NMS 703 instructs EMFG 707 to start capturing an ECM metadata file (EMF) for a particular event (step 1601). In response, EMFG 707 instructs ECM capture and cache 705 to start capturing ECMs (step 1603). ECM capture and cache 705 then joins the ECM multicast and starts to receive information from the ECM multicast (step 1607) as described above in relation to FIG. 10, step 1005. On receiving the information from the ECM multicast, ECM capture and cache 705 adds an ETS to the information (step 1609). At the end of the event broadcast, NMS 703 instructs EMFG 707 to stop capturing the EMF (step 1611) and in response EMFG 707 instructs ECM capture and cache 705 to stop capturing ECMs (step 1613). EMFG 707 also requests the captured ECMs from ECM capture and cache 705 (step 1615). ECM capture and cache 705 then sends the ECM, RECM, parity and ETS information to EMFG (step 1616) and leaves the ECM multicast (step 1617). EMFG 707 stores the EMF (step 1619). When required, NMS 703 requests the stored EMF from EMFG 707 (step 1621) and the EMF is returned in response (step 1623). The EMF is then distributed to PAS 709 (step 1625) and NMS 703 marks the event available for viewing (step 1627).

Figure 17:
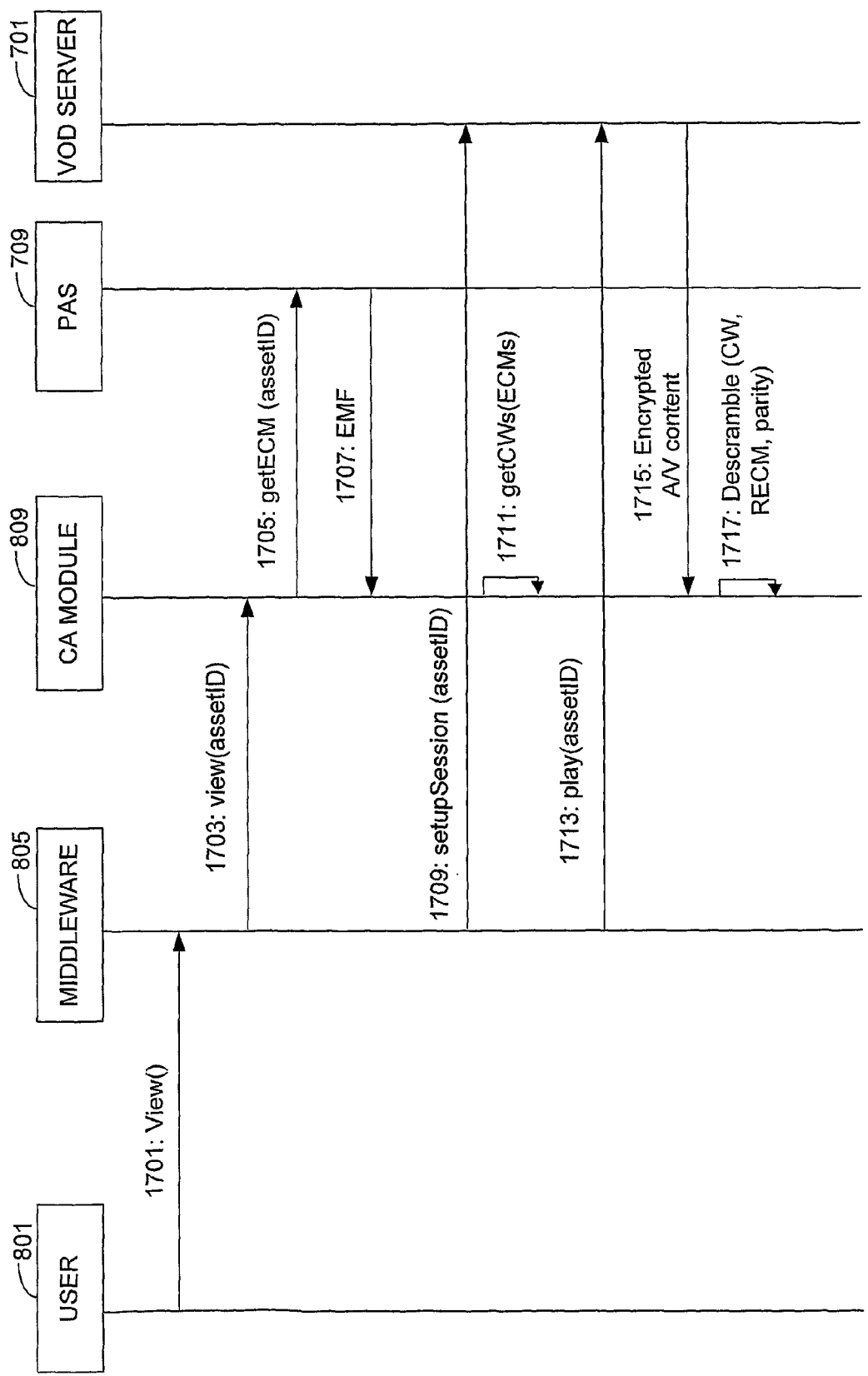
FIG. 17 is a message flow diagram showing a method for viewing scrambled video content that has been recorded in a network, according to embodiments of the present invention.

Referring now to FIG. 17, user 801 selects to view a broadcast event that has been automatically recorded by the service provider and is stored in the archive of the service provider (step 1701). The recording has finished and the EMF containing the ECMs is available from PAS 709. In response, middleware 805 sends the view request to CA module 809 (step 1705). CA module 809 then requests the ECMs from PAS 709 and PAS 709 sends back the relevant EMF to CA module 809 (step 1707). Middleware 805 then sends a set up request to VOD server 701 (step 1709) and CA module 809 extracts the CWs using the EMF (step 1711). Middleware 805 then instructs VOD server 701 to play the event (step 1713) and VOD server 701 then sends the encrypted A/V content to CA module 809 (step 1715). CA module 809 descrambles the encrypted A/V content using the CWs (step 1717).

In the above described embodiments, STB 113 began caching OOB-ECMs as soon as STB 113 was switched on or as soon as user 801 changed channel. In alternative embodiments, scrambled A/V content (together with in-band ECMs) could initially be received by STB 113 via a broadcast and caching of OOB-ECMs only begins when user 801 elects to pause the broadcast. It is also possible to stop caching OOB-ECMs once the user 801 has caught up with the live broadcast of the scrambled A/V content.

In alternative embodiments, STB 113 could be a hybrid STB having IPTV functionality and additional functionality enabling it to receive A/V content from an additional broadcast television network such as, but not limited to, a satellite TV network, a cable TV network, a terrestrial TV network, Digital Video Broadcasting—Terrestrial (DVB-T) network, DVB-Cable (DVB-C) network, DVB-Handheld (DVB-H) network, DVB-Satellite (DVB-S) network, DVB-Satellite-$2^{nd}$ Generation (DVB-S2) network, Advanced Television Systems Committee (ATSC) network, Integrated Services Digital Broadcasting (ISDB) network, $3^{rd}$ Generation Partnership Project (3GPP) network, Digital Multimedia Broadcasting (DMB) network etc. Other types of broadcast television technologies will be apparent to someone skilled in the art. The hybrid STB is operable in a hybrid TV system having nPVR functionality. In such a hybrid system, live A/V content is preferably delivered over the broadcast TV network. OOB ECMs may also be delivered to STB 113 over the broadcast TV network or the STB could constantly extract in-band ECMs from the broadcast feed. Alternatively, OOB ECMs could be delivered to STB over a multicast as described above. When a viewer starts viewing recorded content, the ECMs continue to be extracted from the OOB ECM stream or from the broadcast feed and the A/V content is unicast streamed by a VOD server.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

The invention claimed is:

1. A method of decrypting a scrambled digital data item at a client, said method comprising:
 receiving a request at said client from a user to tune to a channel;
 receiving via a multicast or a broadcast television network, actual control messages at said client, wherein each actual control message comprises control word generating information for generating a control word associated with the actual control message;
 storing said actual control messages at said client;
 receiving, via a multicast or a broadcast television network, at said client, a portion of said scrambled digital data item after a tune point in said scrambled digital data item at which said user tuned to said channel, wherein said portion of said scrambled digital data item is received independently of said actual control messages;
 receiving a further request at said client from said user to rewind past the tune point;
 stopping the receiving of said portion of said scrambled digital data item while continuing to receive and store actual control messages;
 receiving, via a unicast, actual control messages associated with a previous portion of said scrambled digital data item prior to the tune point;
 receiving, via a unicast, said scrambled digital data item; and
 decrypting said scrambled digital data item received via unicast using said actual control messages associated with said previous portion and said actual control messages stored at said client;
 wherein said scrambled digital data item comprises a plurality of segments of scrambled digital data, each segment of scrambled digital data being associated with one of said actual control messages and being scrambled with the control word associated with said one of said actual control messages, and wherein said scrambled digital data item further comprises a plurality of reference control messages, each segment of scrambled digital data comprising one of said reference control messages, each of said reference control messages comprising a control message reference value identifying the actual control message associated with the segment of scrambled digital data.

2. A method according to claim 1, wherein said actual control messages are received via a multicast.

3. A method according to claim 1, wherein said actual control messages are received via a broadcast television network.

4. A method according claim 1, wherein said portion of said scrambled digital data item is received via a multicast.

5. A method according to claim 1, wherein said portion of said scrambled digital data item is received via a broadcast television network.

6. A method of decrypting a scrambled digital data item at a client, said method comprising:
 receiving a first portion of said scrambled digital data item at said client via a broadcast as a broadcast scrambled digital data item, said broadcast scrambled digital data item comprising a plurality of broadcast control messages, each broadcast control message comprising broadcast control word generating information for generating a broadcast control word associated with the broadcast control message, said broadcast scrambled digital data item also comprising a plurality of segments of broadcast scrambled digital data, each segment of said broadcast scrambled digital data being associated with one of said plurality of broadcast control messages and being scrambled using the broadcast control word associated with said one of said broadcast control messages;
 decrypting said first portion of said scrambled digital data item using said plurality of broadcast control messages without storing said first portion of said scrambled digital data item at said client;
 stopping the receiving of said broadcast scrambled digital data item;
 receiving actual control messages at said client, wherein each actual control message comprises control word generating information for generating a control word associated with the actual control message;
 storing said actual control messages at said client;
 receiving a further portion of said scrambled digital data item at said client, wherein said further portion of said scrambled digital data item comprises a plurality of segments of scrambled digital data, each segment of scrambled digital data being associated with one of said actual control messages and being scrambled with the control word associated with said one of said actual control messages, and wherein said further portion of said scrambled digital data item further comprises a plurality of reference control messages, each segment of scrambled digital data comprising one of said reference control messages, each of said reference control messages comprising a control message reference value identifying the actual control message associated with the segment of scrambled digital data; and decrypting said further portion of said scrambled digital data item using said plurality of actual control messages without storing said further portion of said scrambled digital data item at said client.

7. A method according to claim 6, wherein a command from said client causes the stopping of receiving of said broadcast scrambled digital data item.

* * * * *